United States Patent
Veit et al.

(10) Patent No.: US 7,805,383 B2
(45) Date of Patent: Sep. 28, 2010

(54) PRICE PLANNING SYSTEM AND METHOD INCLUDING AUTOMATED PRICE ADJUSTMENT, MANUAL PRICE ADJUSTMENT, AND PROMOTION MANAGEMENT

(75) Inventors: Thomas Veit, Kirchheimbolanden (DE); Ines Wannemacher, Saarbrucken (DE); Susanne Ziehl, Blieskastel (DE); Thomas Roth, Norderstedt (DE)

(73) Assignee: SAP AG, Walldorf (DE)

( * ) Notice: Subject to any disclaimer, the term of this patent is extended or adjusted under 35 U.S.C. 154(b) by 866 days.

(21) Appl. No.: 10/900,970

(22) Filed: Jul. 28, 2004

(65) Prior Publication Data

US 2005/0197896 A1    Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 99/00* (2006.01)

(52) U.S. Cl. .................... 705/400; 705/1.1; 705/8; 705/10; 705/20; 705/28; 705/40; 705/50; 706/12; 706/14

(58) Field of Classification Search ............... 705/400, 705/1, 10, 28, 1.1, 40, 50; 706/12, 14
See application file for complete search history.

(56) References Cited

U.S. PATENT DOCUMENTS

| | | |
|---|---|---|
| 5,400,253 A | 3/1995 | O'Connor |
| 5,758,327 A | 5/1998 | Gardner et al. |
| 5,873,069 A | 2/1999 | Reuhl et al. |
| 5,930,771 A | 7/1999 | Stapp |
| 5,974,418 A | 10/1999 | Blinn et al. |
| 6,076,071 A * | 6/2000 | Freeny, Jr. .................. 705/26 |
| 6,151,608 A | 11/2000 | Abrams |
| 6,272,472 B1 | 8/2001 | Danneels et al. |
| 6,484,149 B1 | 11/2002 | Jammes et al. |
| 6,507,851 B1 | 1/2003 | Fujiwara et al. |
| 6,513,016 B1 | 1/2003 | Freeny, Jr. |

(Continued)

FOREIGN PATENT DOCUMENTS

JP     2004-030343     1/2004

(Continued)

OTHER PUBLICATIONS

SAS® Markdown Optimization, 2004, Flyer, 2 pages.*

(Continued)

*Primary Examiner*—John W Hayes
*Assistant Examiner*—Freda Ann Nelson
(74) *Attorney, Agent, or Firm*—Foley & Lardner LLP

(57) ABSTRACT

The present invention discloses a method, program, product and system for managing the sale of a product. The system can determine if the product is a slow seller, determining a markdown to be applied to a price of the product, reconciling a markdown budget with the determined markdown to be applied to the price to determine whether the markdown will be applied, and adjusting the price of the product by the markdown. The system can also apply manual pricing data and promotion pricing data. The system integrates several tasks required for selling articles and services.

19 Claims, 21 Drawing Sheets

U.S. PATENT DOCUMENTS

| | | | |
|---|---|---|---|
| 6,553,352 B2* | 4/2003 | Delurgio et al. ............. 705/400 |
| 6,609,101 B1 | 8/2003 | Landvater |
| 6,678,695 B1 | 1/2004 | Bonneau et al. |
| 6,910,017 B1 | 6/2005 | Woo et al. |
| 6,980,966 B1 | 12/2005 | Sobrado et al. |
| 7,080,066 B1* | 7/2006 | Scheurich et al. ............. 707/3 |
| 7,085,734 B2 | 8/2006 | Grant et al. |
| 7,092,929 B1* | 8/2006 | Dvorak et al. ................. 705/28 |
| 7,117,165 B1 | 10/2006 | Adams et al. |
| 7,139,731 B1 | 11/2006 | Alvin |
| 7,155,402 B1 | 12/2006 | Dvorak |
| 7,240,019 B2 | 7/2007 | Delurgio et al. |
| 7,249,033 B1* | 7/2007 | Close et al. .................... 705/1 |
| 7,251,615 B2 | 7/2007 | Woo |
| 7,308,421 B2* | 12/2007 | Raghupathy et al. .......... 705/20 |
| 7,373,314 B2 | 5/2008 | Aliabadi et al. |
| 7,379,890 B2 | 5/2008 | Myr et al. |
| 7,383,990 B2 | 6/2008 | Veit |
| 2001/0039519 A1* | 11/2001 | Richards ...................... 705/27 |
| 2002/0023500 A1 | 2/2002 | Chikuan et al. |
| 2002/0026368 A1* | 2/2002 | Carter, III .................... 705/20 |
| 2002/0078159 A1 | 6/2002 | Petrogiannis et al. |
| 2002/0087583 A1* | 7/2002 | Morgan et al. .............. 707/200 |
| 2002/0107713 A1 | 8/2002 | Hawkins |
| 2002/0116348 A1 | 8/2002 | Phillips et al. |
| 2002/0147668 A1 | 10/2002 | Smith et al. |
| 2002/0184116 A1 | 12/2002 | Tam et al. |
| 2003/0023500 A1 | 1/2003 | Boies et al. |
| 2003/0027437 A1* | 2/2003 | Worz ........................... 439/69 |
| 2003/0028437 A1* | 2/2003 | Grant et al. .................... 705/26 |
| 2003/0046195 A1 | 3/2003 | Mao |
| 2003/0083961 A1 | 5/2003 | Bezos et al. |
| 2003/0120546 A1 | 6/2003 | Cusack et al. |
| 2003/0120579 A1* | 6/2003 | Carter, III .................... 705/36 |
| 2003/0130883 A1* | 7/2003 | Schroeder et al. ............ 705/10 |
| 2003/0158791 A1 | 8/2003 | Gilberto et al. |
| 2003/0172007 A1 | 9/2003 | Helmolt et al. |
| 2003/0200156 A1 | 10/2003 | Roseman et al. |
| 2003/0212617 A1 | 11/2003 | Stone et al. |
| 2003/0216969 A1 | 11/2003 | Bauer et al. |
| 2003/0229502 A1 | 12/2003 | Woo |
| 2004/0019494 A1 | 1/2004 | Ridgeway et al. |
| 2004/0098358 A1 | 5/2004 | Roediger |
| 2004/0117377 A1 | 6/2004 | Moser et al. |
| 2004/0162763 A1 | 8/2004 | Hoskin et al. |
| 2004/0186783 A1 | 9/2004 | Knight et al. |
| 2004/0210542 A1 | 10/2004 | Sweeney |
| 2004/0220861 A1 | 11/2004 | Morciniec et al. |
| 2004/0267674 A1 | 12/2004 | Feng et al. |
| 2004/0267676 A1* | 12/2004 | Feng et al. .................. 705/400 |
| 2005/0055283 A1 | 3/2005 | Zarovinsky |
| 2005/0060270 A1 | 3/2005 | Ramakrishnan |
| 2005/0075949 A1* | 4/2005 | Uhrig et al. .................... 705/28 |
| 2005/0086122 A1 | 4/2005 | Cirulli et al. |
| 2005/0096963 A1* | 5/2005 | Myr et al. ...................... 705/10 |
| 2005/0102192 A1 | 5/2005 | Gerrits et al. |
| 2005/0102227 A1 | 5/2005 | Solonchev |
| 2005/0165659 A1 | 7/2005 | Gruber |
| 2005/0197851 A1 | 9/2005 | Veit |
| 2005/0197902 A1 | 9/2005 | Veit |
| 2005/0197941 A1 | 9/2005 | Veit |
| 2005/0197972 A1 | 9/2005 | Kettner et al. |
| 2005/0218218 A1 | 10/2005 | Koster |
| 2006/0036507 A1 | 2/2006 | Pujar et al. |
| 2006/0112099 A1 | 5/2006 | Musgrove et al. |
| 2006/0143027 A1 | 6/2006 | Jagannathan et al. |
| 2006/0190308 A1 | 8/2006 | Janssens et al. |
| 2007/0226064 A1 | 9/2007 | Yu et al. |
| 2008/0243578 A1 | 10/2008 | Veit |

FOREIGN PATENT DOCUMENTS

WO     WO 02/13101 A1     2/2002

OTHER PUBLICATIONS

"SAS Acquires Marketmax", Oct. 13, 2003, Outsourced-logistics. com, 3 pgs.*

"Manugistics Announces Powerful Markdown Optimization Solution for Retailers", Jun. 10, 2003; Business Wire, 5 pgs.*

"ProfitLogic Launches ProfitLogis 2004: An Expanded Marchandise Optimization Suite Designed to Help Retailers Make More Profitable Merchandising Decisions", Jan. 12, 2004, Internetretailer.com; 2 pgs.*

"There Goes The Rainbow Nut Crunch", Jul. 19, 2004, BusinessWeek.com, 3 pgs.*

Boyles, Carolee, "Uncover Slow-Selling Inventory-Outdoor Marketplace", Feb. 2003, Shooting Industry, 2 pgs.*

Baxter, John, "Operational Research in Retailing", Sep. 1951), Operational Research Quarterly (1950-1952), vol. 2, No. 3, pp. 39-43, 6 pgs.*

Lee, Calvin B., Ph.D., "Demand Chain Optimization, Pitfalls and Key Principles", 2002, NONSTOP's "Supply Chain Management Seminar", White Paper Series, 27 pgs.*

Mantrala et al. "Am Implementable Approach for Optimizaing Department Store Mark-Down Decisions", Apr. 1994, Stores, V76n4; pp. RR1-RR6 (6 pgs).*

"Managing Markdown Madness", Mar. 1999, Chain Store Age: 75, 3, p. 118; 2 pgs.*

U.S. Appl. No. 60/374,892, filed Apr. 22, 2006, Krajec.

"Beyond Markdown Management", summer/autumn 03, the 4caster, Issue 4, vol. 2, 4 pages.

"Retailers Manage Markdown Challenges Using i2 Solutions", Jan. 13, 2003, NFR 92nd Annual Convention & Expo, 2 pages.

Abraham et al., "An implemented system for improving promotion productivity using store scanner data", Marketing Science, Summer 1993, vol. 12, No. 3, pp. 248-269.

Author unknown, "Staffware and Biomni join forces to provide end-to-end e-procurement solution with enhanced workflow capability: Self-service functionality will enable thousands of transactions to be handled daily from the desktop," M2 Presswire, Coventry, Feb. 6, 2001, 1 page.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Subrahmanyan et al., "Developing optimal pricing and inventory policies for retailers who face uncertain demand", Journal of Retailing, vol. 72, No. 1, Spring, 1996, 15 pages.

Advisory Action for U.S. Appl. No. 10/926,847, mail date Sep. 3, 2009, 3 pages.

Advisory Action for U.S. Appl. No. 10/927,537, mail date Mar. 31, 2009, 3 pages.

Advisory Action for U.S. Appl. No. 10/927,646, mail date Jun. 22, 2009, 3 pages.

Advisory Action for U.S. Appl. No. 10/985,741, mail date Apr. 7, 2010, 3 pages.

Advisory Action for U.S. Appl. No. 10/985,741, mail date Mar. 30, 2009, 4 pages.

Kelkar et al., Price Modeling in Standards for Electronic Product Catalogs Based on XML, 2002, pp. 366-375.

Mantrala et al., "A Decision-Support System That Helps Retailers Decide Order Quantities and Markdowns for Fashion Goods", Interfaces, vol. 31, No. 3, 2001, pp. S-146-S165.

Notice of Allowance for U.S. Appl. No. 11/074,586, mail date Feb. 4, 2008, 4 pages.

Office Action for U.S. Appl. No. 10/926,847, mail date Apr. 13, 2010, 22 pages.

Office Action for U.S. Appl. No. 10/926,847, mail date Apr. 18, 2008, 15 pages.

Office Action for U.S. Appl. No. 10/926,847, mail date Jun. 20, 2009, 20 pages.

Office Action for U.S. Appl. No. 10/926,847, mail date Oct. 17, 2007, 12 pages.
Office Action for U.S. Appl. No. 10/926,847, mail date Oct. 28, 2008, 13 pages.
Office Action for U.S. Appl. No. 10/926,847, mail date Sep. 23, 2009, 18 pages.
Office Action for U.S. Appl. No. 10/927,537, mail date Jul. 17, 2009, 62 pages.
Office Action for U.S. Appl. No. 10/927,537, mail date Mar. 3, 2010, 51 pages.
Office Action for U.S. Appl. No. 10/927,537, mail date May 6, 2008, 8 pages.
Office Action for U.S. Appl. No. 10/927,537, mail date Nov. 26, 2008, 14 pages.
Office Action for U.S. Appl. No. 10/927,537, mail date Oct. 17, 2007, 12 pages.
Office Action for U.S. Appl. No. 10/927,646, mail date Apr. 12, 2010, 12 pages.
Office Action for U.S. Appl. No. 10/927,646, mail date Apr. 15, 2009, 31 pages.
Office Action for U.S. Appl. No. 10/927,646, mail date Oct. 5, 2009, 12 pages.
Office Action for U.S. Appl. No. 10/927,646, mail date Oct. 8, 2008, 14 pages.
Office Action for U.S. Appl. No. 10/985,741, mail date Jan. 21, 2010, 28 pages.
Office Action for U.S. Appl. No. 10/985,741, mail date Jan. 6, 2009, 16 pages.
Office Action for U.S. Appl. No. 10/985,741, mail date Jun. 25, 2008, 13 pages.
Office Action for U.S. Appl. No. 10/985,741, mail date Jun. 25, 2009, 24 pages.
Office Action for U.S. Appl. No. 10/985,741, mail date Nov. 1, 2007, 10 pages.
Office Action for U.S. Appl. No. 11/074,586, mail date May 15, 2007, 10 pages.
Office Action for U.S. Appl. No. 11/074,586, mail date Nov. 2, 2007, 11 pages.
Office Action for U.S. Appl. No. 12/135,061, mail date Aug. 6, 2009, 6 pages.
Office Action for U.S. Appl. No. 12/135,061, mail date Feb. 16, 2010, 5 pages.
Srinivasan et al., Concepts and strategy guidelines for designing value enhancing sales promotions, Journal of Product and Brand Management, vol. 7, No. 5, 1998, pp. 410-420.

* cited by examiner

PRICE PLANNING SYSTEM AND METHOD INCLUDING AUTOMATED PRICE ADJUSTMENT, MANUAL PRICE ADJUSTMENT, AND PROMOTION MANAGEMENT

PRIORITY

This application claims the benefit of priority to U.S. Provisional Patent Application Ser. No. 60/551,221, filed on Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

A. Field of the Invention

The present invention is directed to the field of marketing of products and services and specifically to the management of marketing of products and services.

B. Background

Marketing products and services involves a large number of tasks. Those tasks involve budgeting, inventory, pricing, promotions, etc. Although the performance of any of these tasks can influence another of the tasks, each of these tasks is conventionally performed by separate personnel and/or systems. Such separation does not necessarily allow feedback of information associated with the tasks.

Effective pricing of products that are made available for sale is often a complicated task. In order to maximize profits, not only must revenue be optimized, but also the costs of inventory must be taken into account. One strategy used is to periodically reduce the price of the products or services, effecting a markdown, in order to encourage sales of the products or services. The amount of the markdown is often set by a sales agent who has had experience in the market for the products or services and can, using his or her experience and intuition determine the timing and amount of markdowns.

In particular, the sale of seasonal products poses a high financial risk for merchants. This risk is even more acute in the retail business. Each seasonal article can be assigned a specific sales period. When high-fashion and fashion articles are involved, the merchant wants to have as little remaining stock as possible at the end of the sales period, as it will be difficult to sell this merchandise even with markdowns. In this case, larger remaining stocks translate to higher losses. In addition to fashion articles, such as pink raincoats, this also applies to other products, such as computer hardware.

For less "fashionable" products, the risk is lower because merchants can store any remaining stock and then try to sell it at the normal price again in the same season of the next year. Because storing inventories is expensive, however, merchants will generally prefer to sell their merchandise by the end of the regular sales period.

Merchants use markdowns to ensure that the merchandise is sold out as completely as possible by the end of a season. Markdowns are price reductions or buyer's incentives aimed at promoting the sale of certain articles. Of course, markdowns reduce the gross margin, which means the revenue merchants earn for selling the merchandise is less than originally planned. Merchants usually plan a certain budget for markdowns that must not be exceeded. Accordingly, markdowns are applied restrictively in retail, which once again increases the risk of remaining stocks at the end of the season.

As discussed above, effective pricing of products is a complicated task which is often performed manually. For example, price adjustments in planning decisions may be used using manual selection systems. Further, a sales promotion may also be implemented in a manual or automated process. A promotion refers to a special event, retail sale, or other activity designed to reduce inventory. For example, spring sales events, two-for-one promotions, end-of-the-season sales, clearance sales, etc. are examples of retail promotions which are utilized to reduce inventory. Sales promotions are different than a markdown controlling process which is not necessarily tied to an event or special circumstance. In addition, manual control of pricing outside of promotions and markdowns may be desirable.

Heretofore, a single system for managing price adjustments or markdowns, promotions, and manual adjustments have not been available. Thus, there is a need for systems including software for providing automatic pricing planning (e.g., a slow seller management process or markdown controlling process), for providing a promotion management process, and for providing manual price adjustments. Further, there is a need for such systems that are in communication with inventory systems to provide a closed loop control of the retail process. Moreover, there is a further need for an integrated system which can globally perform all or most types of price adjustment and planning (e.g., slow seller, promotion, manual input, etc.). Yet, further, there is a need for a system that integrates various types of price planning systems. Further there is a need for a price planning system that incorporates closed loop control over the retail pricing system. Further there is a need for a price planning system configured to implement price changes in view of one or more applicable budgets. Further still, there is a need for a price planning system that provides automated slow seller management, promotion management, and allows for manual input.

SUMMARY OF THE INVENTION

One embodiment of the invention relates to a price planning system. The system comprises an automated pricing engine, a manual pricing engine, and a promotional manager and user interface. The user interface is configured to receive price planning information from one of the automated pricing engine, the promotional manager and the manual pricing engine to generate a price planning schedule.

Another embodiment of the invention relates to a price planning system. The system comprises automated pricing means, manual pricing means, promotional management means and user interface means. The user interface means is configured to receive markdown data, promotion data, and manual pricing data.

Yet another embodiment of the invention relates to a program product including machine-readable program code. The program code, when executed, causes one or more machines to implement an automated pricing engine, a manual pricing engine, a promotion management engine and a user interface. The user interface is configured to receive price planning information from one of the automated pricing engine, the promotion management engine and the manual pricing engine to generate a price planning schedule.

Yet another embodiment relates to a method of pricing. The method of pricing includes receiving automated pricing data from an automated pricing engine, receiving manual pricing data from a manual pricing engine, and receiving promotion pricing data from a promotion engine. The method further includes generating a price planning schedule in response to the automated pricing data, manual pricing data and the promotion engine data.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION OF EXEMPLARY EMBODIMENTS

Figure 1:
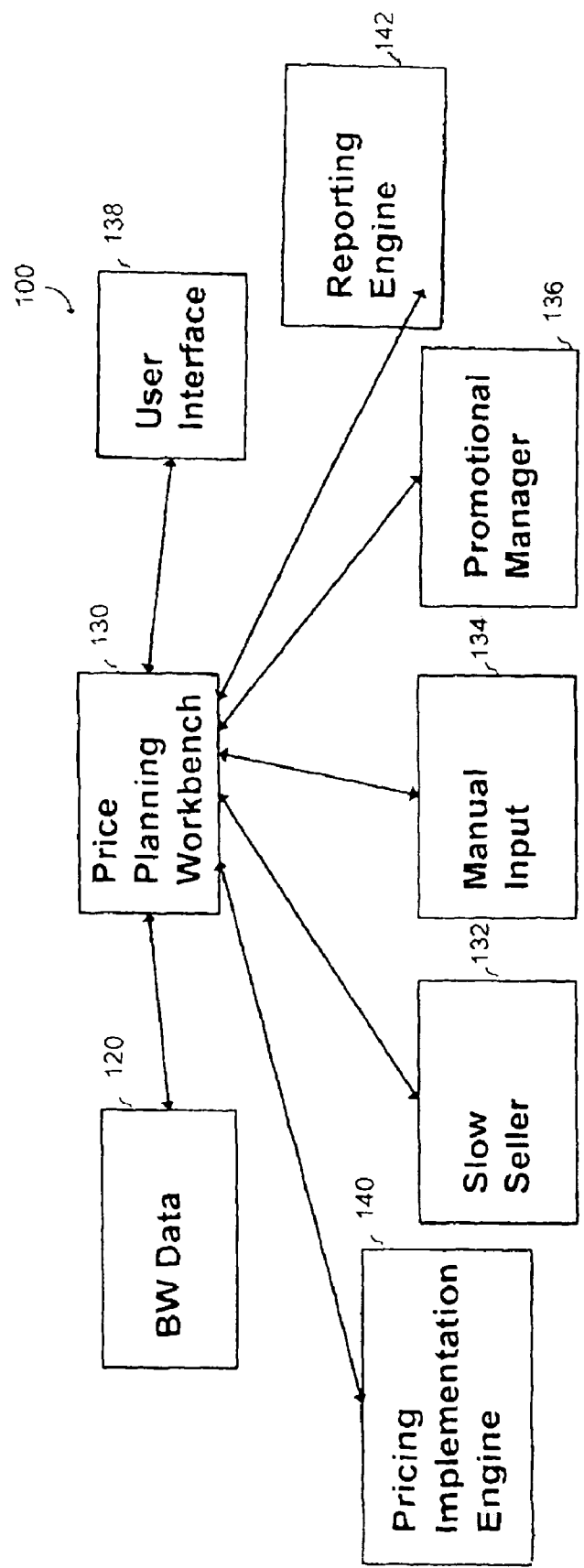
FIG. 1 is a general block diagram illustrating an exemplary embodiment of a system for processing data related to operations and planning for selling goods and services.

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, process, or computers can be utilized. In yet other embodiments, hardwired circuitry may be used in place of, or in combination with, software instructions to implement the functions described. Thus, the embodiments described herein are not limited to any particular source for the instructions executed by the computer system.

In a preferred embodiment, a closed loop retail system is provided which allows for manual price adjustment, promotion management, as well as automated slow seller management. A slow seller in accordance with the present invention, is a product or service that is selling more slowly than anticipated or that is selling at a pace where it becomes unlikely that a target sales quota will be reached. It is important to be able to identify such products and services quickly during a sales cycle and to take remedial measures to improve sales and minimize the negative effects of the lagging sales. Accordingly, an automated slow seller management tool provides significant advantages in retail. Further, the integration of this tool with price planning, manual price adjustments and promotion management allows a single tool to control essentially all of the price planning associated with retail or other sales. Further, communication with budget databases and inventory databases provides a closed loop in which effects associated with pricing through the manual input, promotion management, and slow seller management, are monitored as they affect inventory, budgets, and other business criteria associated with the selling or retail process period.

Such a system allows a user to learn to use only one price planning system rather than separate systems. This advantage results in decreased training time and decreased opportunities for data entry errors and other mistakes.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

Referring now to FIG. 1, a general block diagram illustrates an exemplary embodiment of a planning system 100 for processing data related to retail operations and planning. Planning system 100 can be a closed loop retail planning system and preferably includes a data warehouse 120 and a price planning system 130. Planning system 100 is referred to below as retail planning system 100 and system 130 is embodied as a workbench in the preferred exemplary embodiment.

According to the exemplary embodiment, retail planning system 100 may include additional components configured to manage and implement price planning for retail store operations. For example, retail planning system 100 may further include additional components such as a procurement engine, a supply engine, a merchandise controlling engine, a valuation engine, etc. The components of retail planning system 100 may further be interconnected such that information may be freely exchanged between the components of retail planning system 100. Preferably, information is exchanged through data warehouse 120.

Retail planning system 100 may further be associated with one or more additional external components such as a plurality of cash register systems associated with retail store locations. The cash register systems may be configured to perform a number of functions associated with retail store operation such as pricing implementation, inventory control, data management, etc.

Retail planning system 100 may be implemented as a single system, a distributed system, or any combination thereof. Retail planning system 100 may be implemented using a single computing system, a plurality of computing systems, software, hardware, or any other system or combination of systems to perform the functions described herein. Further, the components associated with system 100 may also be implement using single or multiple systems.

Data warehouse 120 is a data repository configured to receive, sort, and process information related to retail operations and planning. Data warehouse 120 may also be implemented as using a single or multiple systems. Data warehouse 120 may further include one or more functions associated with it to permit a user to efficiently organize and retrieve stored data. Preferably, data warehouse 120 is a Business Information Warehouse (BW) provided by SAP.

Price planning system 130 is preferably a data processing system or software configured to control, display, interface with operators, or perform other operations to generate a price planning schedule. Although system 130 is preferably implemented in an SAP based system, interface, and architecture, any other systems may be utilized.

Price planning system 130 is a data processing system configured to allow a user to perform pricing tasks (e.g., receive price planning input data, access applicable budgeting data, generate a price planning schedule, implement the price planning schedule, etc.) as will be further described below with reference to FIGS. 2-9. According to an exemplary embodiment, price planning system 130 includes a slow seller management engine 132, a manual pricing engine 134, a promotion management engine 136, a user interface 138, and a pricing implementation engine 140. Communication with data warehouse 120 allows system 130 to obtain inventory data, as well as budget data. Inventory and budget data can be used by engines 132, 134 and 136 for providing price planning information.

A price planning schedule may be implemented by a data structure configured to contain information related to one or more price changes. The price changes may include a price change by specifying a new sales price, a percentage change based on the original or current sales price, or an absolute price change by specifying a difference from the original or current sales price. Further, the price planning schedule may include other information associated with the price change such as timing information, quantity limits, automatic versus manual implementation, associated articles, etc.

Price planning system 130 is generally configured to enable a user to take corresponding budget data into account in planning and activating price changes to create a price planning schedule based on pricing, input information. During the creation of the price planning schedule, an initial budget planning value may be created representing an effect on the corresponding budget.

Subsequently, upon activation of the price changes during defined validity dates, the corresponding budget may be updated based upon actual sales occurring under the price planning schedule and/or forecasted sales. During the process of updating, the initial budget planning value may be compared with a budget usage resulting from implementation of the price planning schedule and involved article quantities. Advantageously, implementing a price planning schedule in conjunction with a corresponding budget enables cost control for any price reductions.

Generally, engines 132, 134, and 136 communicate with price planning system 130 either directly or as a downstream process. System 130 is configured to interface with each engine using custom information for that engine (for example, a slow seller management system). According to an alternative embodiment, engines 132, 134 and 136 may be implemented as components within price planning system 130.

Slow seller management engine 132 may be a system configured to communicate with one or more of a budgeting system, a planning system, an inventory system, or any other systems within or in communication with system 100. According to an exemplary embodiment, slow seller management system 132 is configured to identify and recommend pricing or other strategies for products or inventory that is selling at a slower rate than forecast. Pricing strategies may include recommended markdowns to increase sales rate. Slow seller management engine 132 is discussed in further detail below with reference to FIG. 2.

Manual pricing engine 134 may be any system or method for generating price planning input based on manual input received from a user. According to an exemplary embodiment, a user may utilize a user interface associating with manual pricing engine 134 or user interface 138 for price planning system 130 to enter one or more price changes such as a new sales price, a percentage change based on the original or current sales price, or an absolute price change by specifying a difference from the original or current sales price. The user may further enter any associated information such as timing information, quantity information, store location information, etc. Manual pricing engine 134 is discussed in further detail below with reference to FIG. 3.

Promotion management engine 136 may be any system or method for generating price planning input based upon one or more promotions. A promotion may be a promotion associated with a particular store, a chain of stores, a particular article, a line of articles, a geographic location or region, etc. A promotion may include a price change, timing information, article information, store location, or any other information related to the promotion to be implemented. Promotion management engine 136 is discussed in further detail below with reference to FIG. 4.

User interface 138 may be any type of interface configured to allow a user to interact with price planning system 130 and/or any associated components such as slow seller management engine 132, manual pricing engine 134, and promotion management engine 136. Interface 138 may be configured such that each user is assigned to one or more specific budgets, which in turn are assigned to specific articles. Advantageously, user assignments may be used to define the set of articles that a user is authorized to process. Interface 138 may further be configured to display the status of a price planning schedule during any stage of preparation and/or implementation. Interface 138 is discussed in further detail below with reference to FIG. 7.

Pricing implementation engine 140 may be any type of system or method configured to receive a price planning schedule and communicate with one or more components associated with retail planning system 100 to implement price changes defined in the price planning schedule. Pricing implementation engine 140 may be further configured to implement functions associated with the price changes such as budgets updates, inventory tracking, etc. Pricing implementation engine 140 is discussed in further detail below with reference to FIGS. 8 and 9.

According to alternative embodiments, price planning system 130 may include more, fewer, or different systems than described above to facilitate creation, processing, and maintenance of a price planning schedule. In addition, functions associated with one or more systems described above may alternatively be associated with one or more alternative systems. For example, manual pricing engine 134 may be implemented as a component within promotion management engine 136.

Figure 2:
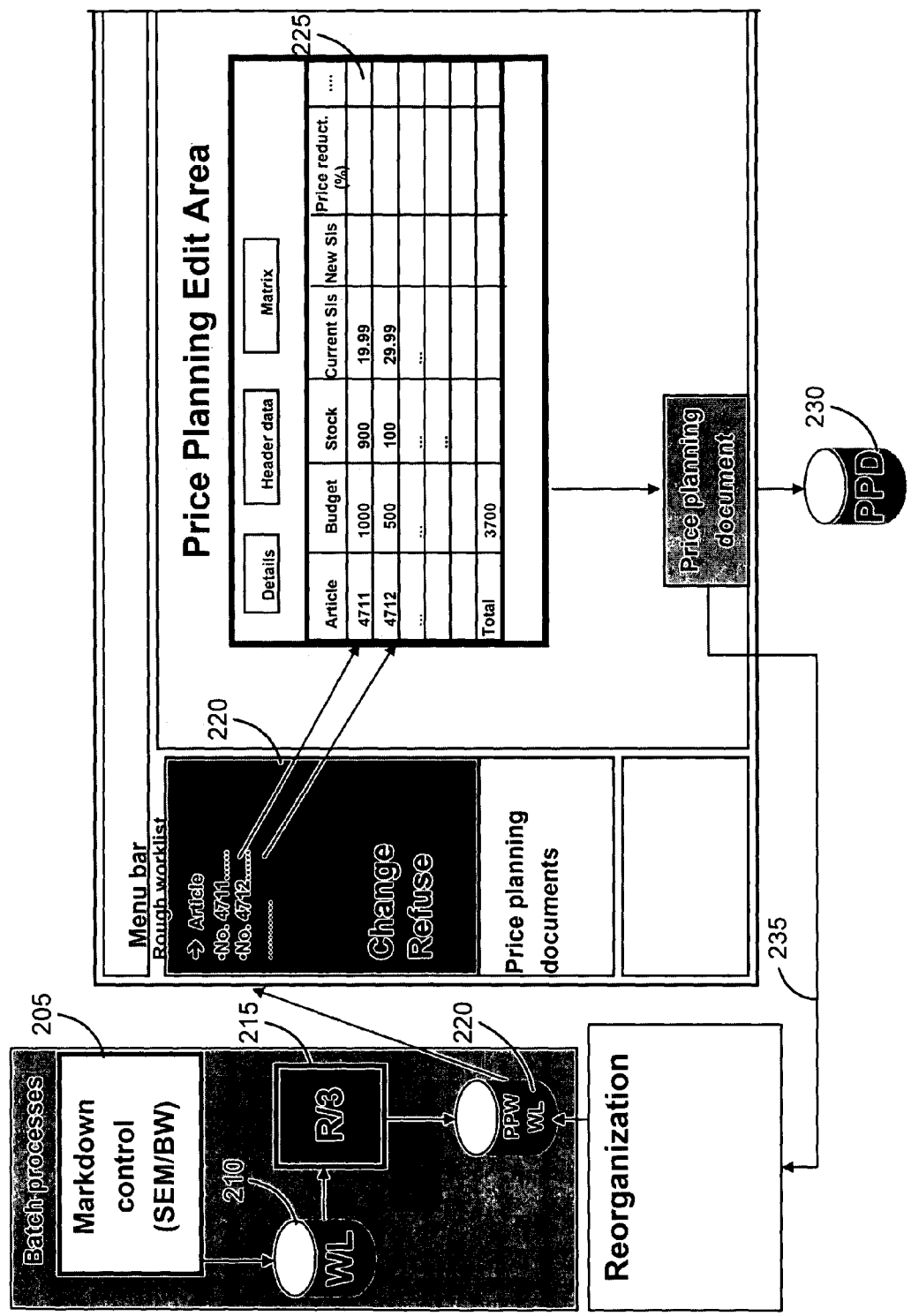
FIG. 2 is a process flow block diagram illustrating an exemplary embodiment of a method for transferring markdown controlling and markdown planning information from a slow seller management engine to a price planning system.

Referring now to FIG. 2, a process flow block diagram illustrates an exemplary embodiment of a method for transferring markdown controlling and markdown planning information from slow seller management engine 132 to price planning system 130. Generally, the data is transferred directly to system 130 through a background processing-capable interface and saved within system 130 as described below.

In a step 205, slow seller management engine 132 is configured to apply one or more sets of rules to generate one or more price change proposals from markdown profiles. The markdown profiles used to generate the price change proposals may include sets of price changes that are applied to single article or groups of articles based on levels of inventory that remain unsold after a specific time period.

According to an exemplary embodiment, the price changes proposals created form the markdown profiles may be saved in a worklist 210 using batch processing on a data warehouse system. Worklist 210 at this point may include information related to the price change proposal such as a price activation level, an actual lifecycle, a total lifecycle, an analysis date, a sales quota, a target sales quota, a proposed markdown percentage, a current stock level, a unit of measure, articles affected by the price changes, etc. Worklist 210 may include information related to single articles or group of articles After worklist 210 is created on the backend data warehouse system, it may be transferred in a step 215 to a rough worklist 220 in price planning system 130, which may be running on a front end system. According to an exemplary embodiment, the transfer from the back end data warehouse system to price planning system 130 on the front end system may be accomplished automatically using a background processing-capable interface.

According to an exemplary embodiment, transferring step 215 includes a data enrichment substep. For example, rough worklist 220 may be populated and enriched with data such as sales prices, budget data, stocks, etc. Rough worklist 220 may be populated with such enriched data when rough worklist 220 is initially created and/or at periodic updates and/or in real-time.

According to an exemplary embodiment, user interface 138 of price planning system 130 may be configured to allow the customer to enhance the data enrichment process. Advantageously, allowing the user to intervene provides the user with greater control to provide relevant and contemporaneous data in the creation of a price planning schedule.

According to an exemplary embodiment, transferring step 215 may also include a substep that checks for conflicts within rough worklist 220. For example, the system may return a message such as "article number not found." Any inconsistent data found during this process may be reported to the user through user interface 138. Prior to processing worklist 220 containing the erroneous data records, user interface 138 may be configured to allow the user to correct the errors if necessary. The errors may be recorded in an error log for later analysis to reduce future occurrences.

From rough worklist 220, a user may transfer the price change proposals or articles to an editing area 225 of user interface 138 for possible editing of enriched data.

Following editing of the price planning system worklist, the worklist may be saved as a price planning schedule within a price planning document (PPD) 230. Price planning document 230 may be any type of document that includes a price planning schedule and/or other information needed to implement the price changes suggested in the price planning system worklist. Exemplary information may include article data, stock quantities, associated price markdowns, price activation levels, budget data, etc.

Following creation of price planning document 230, the corresponding data may be deleted from rough worklist 220 in a step 235. The deletion of such data reduces the amount extraneous data stored within price planning system 130 and thus improves efficiency and reduces required storage.

Figure 3:
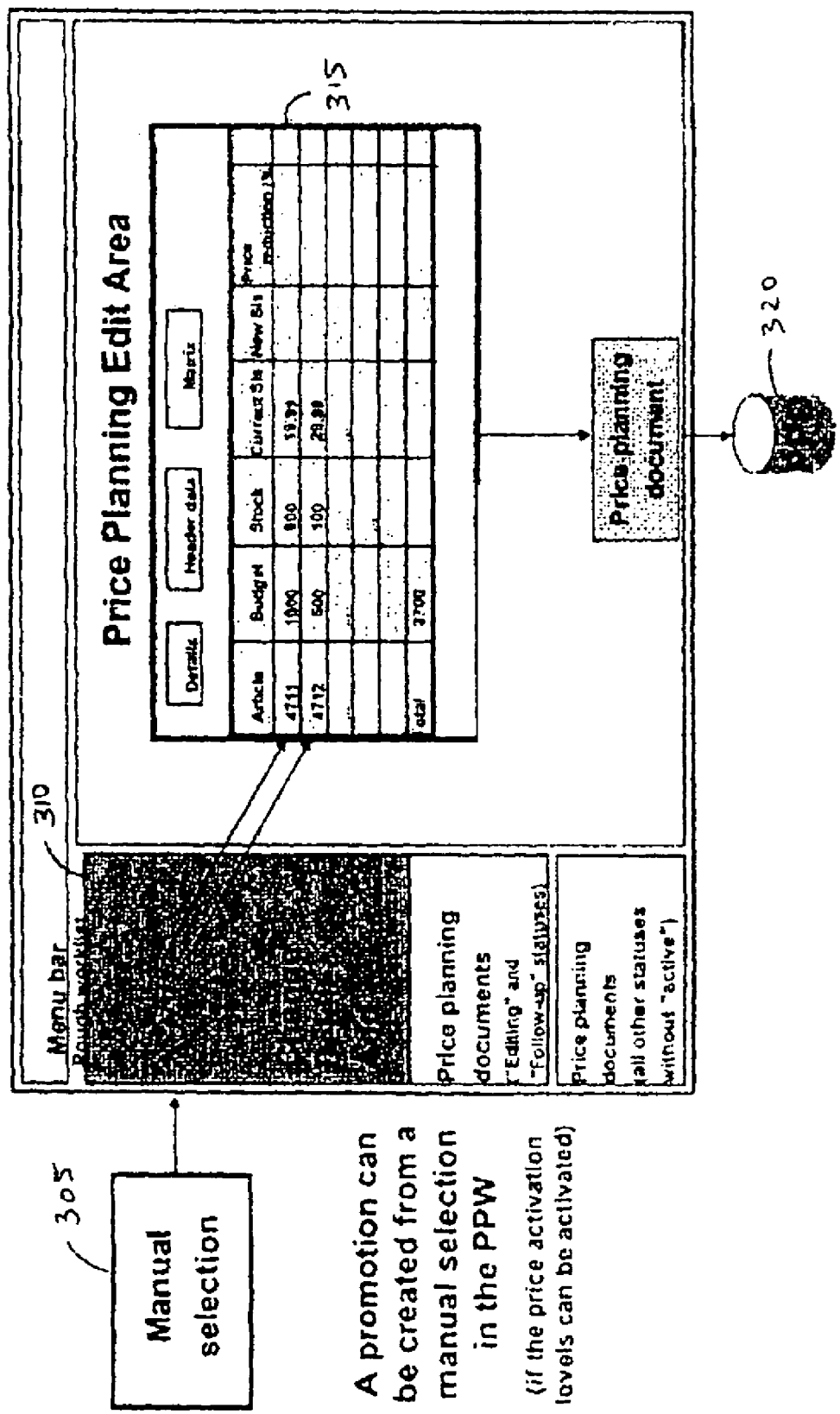
FIG. 3 is a process flow block diagram illustrating an exemplary embodiment of a method for generating a worklist including manual price changes within a manual pricing engine and transferring the worklist to a price planning system to generate a price planning document.

Referring now to FIG. 3, a process flow block diagram illustrates an exemplary embodiment of a method for generating a worklist by selecting articles including manual price changes within manual pricing engine 134 and transferring the worklist to price planning system 130 to generate a price planning document. The manual price changes may include definitions of price activation levels (organization levels) where the new sales prices to be defined can also be identified.

In a step 305, a user may utilize user interface 138 to select one or more articles for which a manual price change is desirable. According to an exemplary embodiment, user interface 138 may be utilized to display an article hierarchy for which a particular user is authorized to implement manual price changes. The user may navigate through such an article hierarchy to select a particular article or group of articles for which price changes are to be implemented. Selected articles are initially displayed hierarchically in a rough worklist 310 in user interface 138.

Figure 3A:
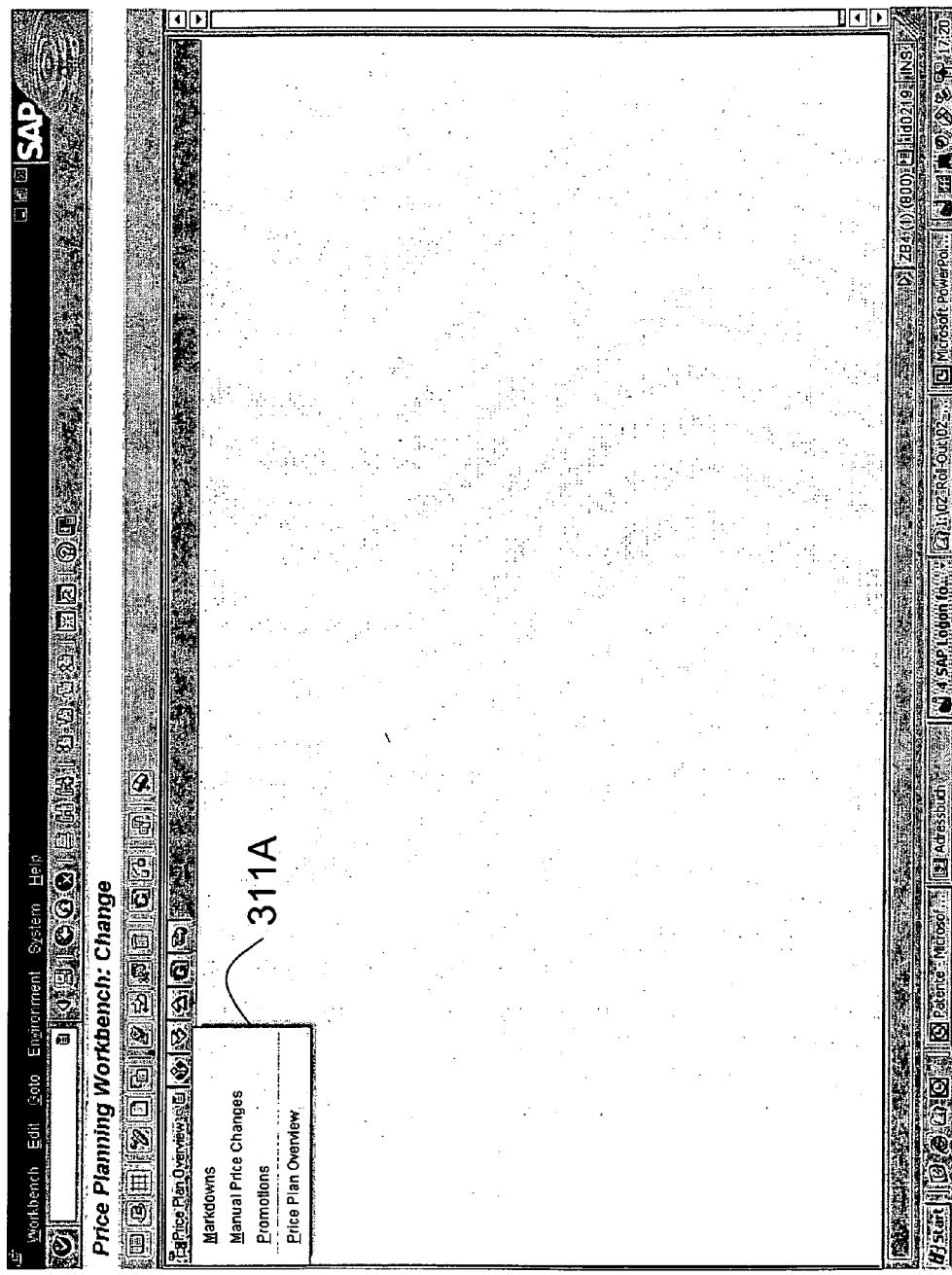
FIG. 3A is a screen drawing for the price planning system illustrated in FIG. 3.

In one exemplary embodiment shown in FIG. 3A, price planning system 130 can include a menu 311 for providing changes to various price planning criteria. Changes can be made to mark downs, manual price changes, and promotions. Further, a price plan overview can be selected via system 130.

Figure 3B:
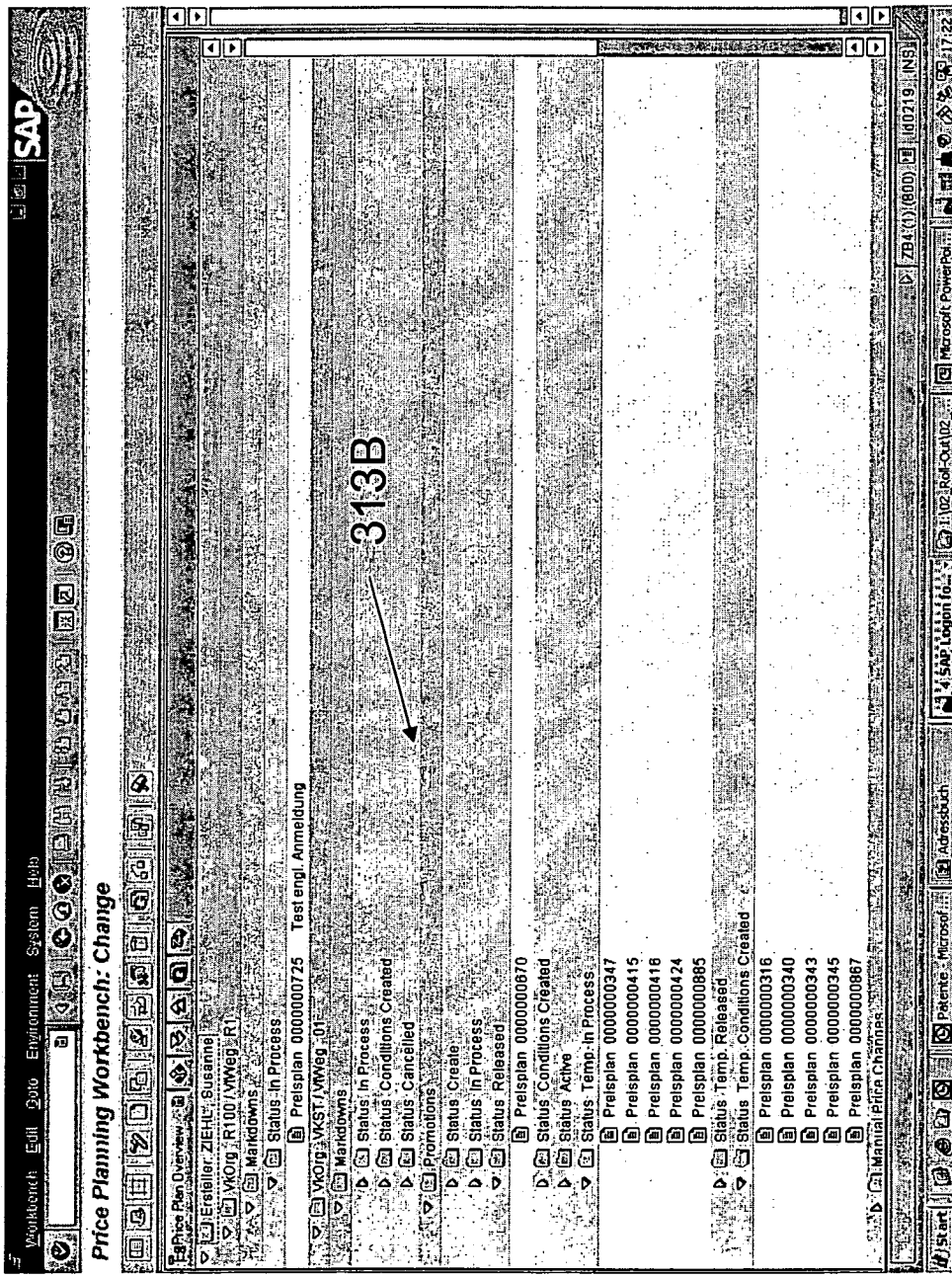
FIG. 3B is a screen drawing for the price planning system illustrated in FIG. 3.

As shown in FIG. 3B, the price plan overview can provide the status of markdowns, manual price changes, and promotions in a tree structure 313B. The changes can be arranged in folders related to status. The folders can be labeled status create, status in process, status released, status conditioned created (price change), status active, status temporary in process, status temporary conditions (price change) created, and status temporary release. The folders can be organized under each of markdowns, manual price changes, and promotions. The folders contain information on the articles in each status category. Status released, status temp in process, and status temp released folders can contain the price planning document associated with the change.

Figure 3C:
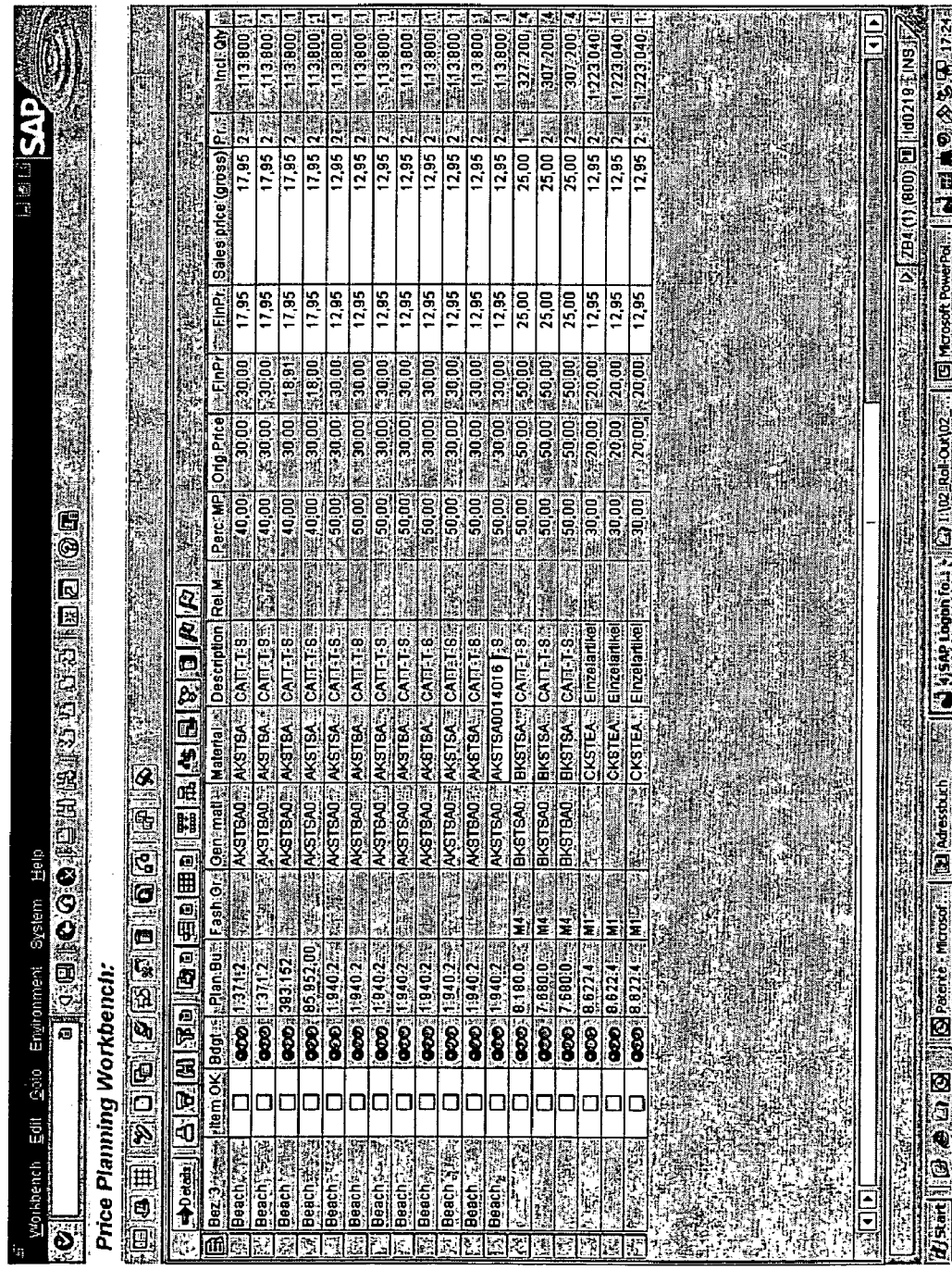
FIG. 3C is a screen drawing for the price planning system illustrated in FIG. 3.

As shown in FIG. 3C, system 130 can also include a screen providing article information in columns in the edit area in one exemplary embodiment. The columns can include a budget indicator indicating whether the anticipated budget for the article is above, below or adequate. The columns can also include a reference to the type of article (e.g., beach article, casual article, etc.), the planned budget, the fashion type of the article, the general material of the article, the quantity of the general material, the percentage of the markdown profile, the original price, the final price, the sales price (gross), and the quantity of the article. The article view is preferably a summary display for article quantities and budget values that are arranged hierarchically by the relevant organizational levels to the extent possible. The initial level of the edit area of system 130 is preferably set to the article view aggregated by organizational level.

Following selection of the articles in step 305 and creation of rough worklist 310, the articles in rough worklist 310 may be selectively transferred to an editing area 315 within user interface 138. Further, as described above with reference to FIG. 2, the transferred data may be enriched or supplemented with other data specific to the article or data available through price planning system 130.

Editing area 315 may be utilized to make changes to article prices and other attributes of the selected articles. As mentioned above, price changes may include a new specific price, a percentage markdown from an existing price, a reduction by a specific amount, etc. Further, price changes may include effective dates or other timing information. For example, a price change may include a series of price changes wherein each price change is set to occur on a specific date. Alternatively, a price change may include more specific information, such as setting a percentage price change based on the quantity of articles still in stock at a particular date.

After the selected articles have been edited in editing area 315, the articles may be saved as a price planning schedule within a price planning document (PPD) 320. Price planning document 320 may be any type of document that includes a price planning schedule and/or other information needed to implement the price changes suggested in the price planning system worklist. Exemplary information may include article data, stock quantities, associated price markdowns, price activation levels, budget data, etc.

Figure 4:
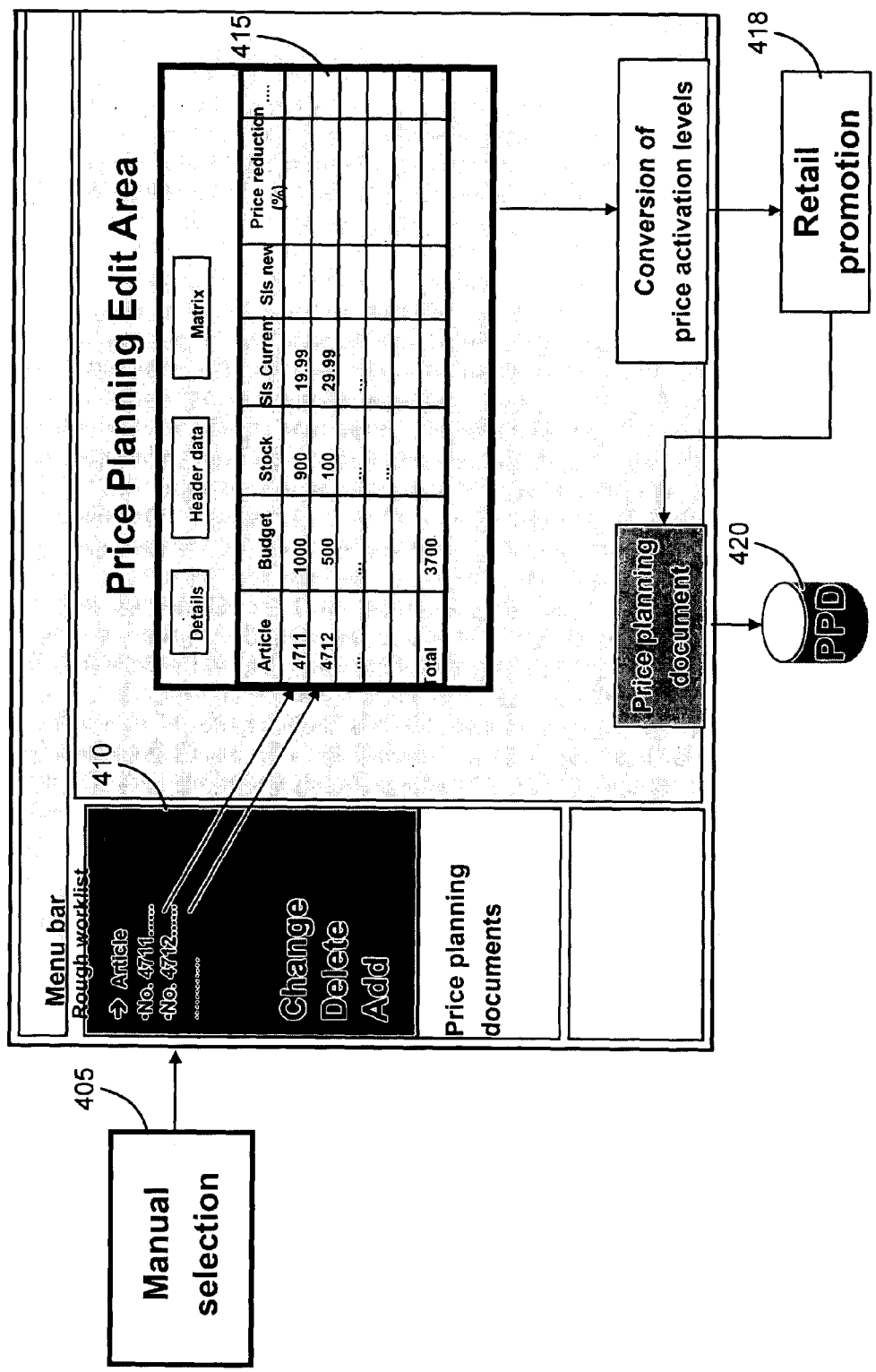
FIG. 4 is a process flow block diagram illustrating an exemplary embodiment of a method for generating a worklist including promotional related information within a promotion management engine and transferring the worklist to a price planning system.

Referring now to FIG. 4, a process flow block diagram illustrates an exemplary embodiment of a method for generating a worklist including promotional related information within promotion management engine 136 and transferring the worklist to price planning system 130. A promotion may be a sales event, a seasonal sale, etc.

Merchants often use markdowns to ensure that merchandise is nearly or completely sold out by the end of a season. Markdowns are price reductions such as retail sales promotions aimed at promoting the sale of certain articles to reduce inventory. Retail sales promotions reduce the gross margin, which means the revenue merchants earn for selling the merchandise is less than originally planned. Merchants usually plan a certain budget for retail sales promotions that must not be exceeded. Accordingly, retail sales promotions are applied restrictively in retail, which further increases the risk of remaining stocks at the end of the season. The primary goal in managing seasonal merchandise is to limit retail sales promotions to a minimum and apply them at the best suitable time and with maximum flexibility while ensuring that nearly all the merchandise is sold by the end of the season.

In order to achieve a high degree of integration between price planning system 130 and promotion management engine 136, engine 136 may be configured to be actuated from user interface 138 of price planning system 130. For example, user interface 138 may include a "create promotion" button or icon to allow a user to convert article pricing data that has been manually created using a process such as described above in connection with FIG. 3. For example, articles may be manually selected from an article hierarchy in a step 405, which results in a rough worklist 410. From rough worklist 410, selected articles may be transferred to an editing area 415. Then, when the "create promotions" function is activated, the manually entered price planning information (e.g., price activation levels) for the articles in editing 415 is converted into a retail promotion 418. Conversion of the manually entered price planning information into retail promotion 418 may also include adoption of data structures from manual pricing. When promotion 418 is created, user interface 138 may be utilized to enter additional promotion-relevant data (e.g., header data of the promotion. After retail promotion 418 is approved, it may be saved to a price planning document 420.

Figure 5:
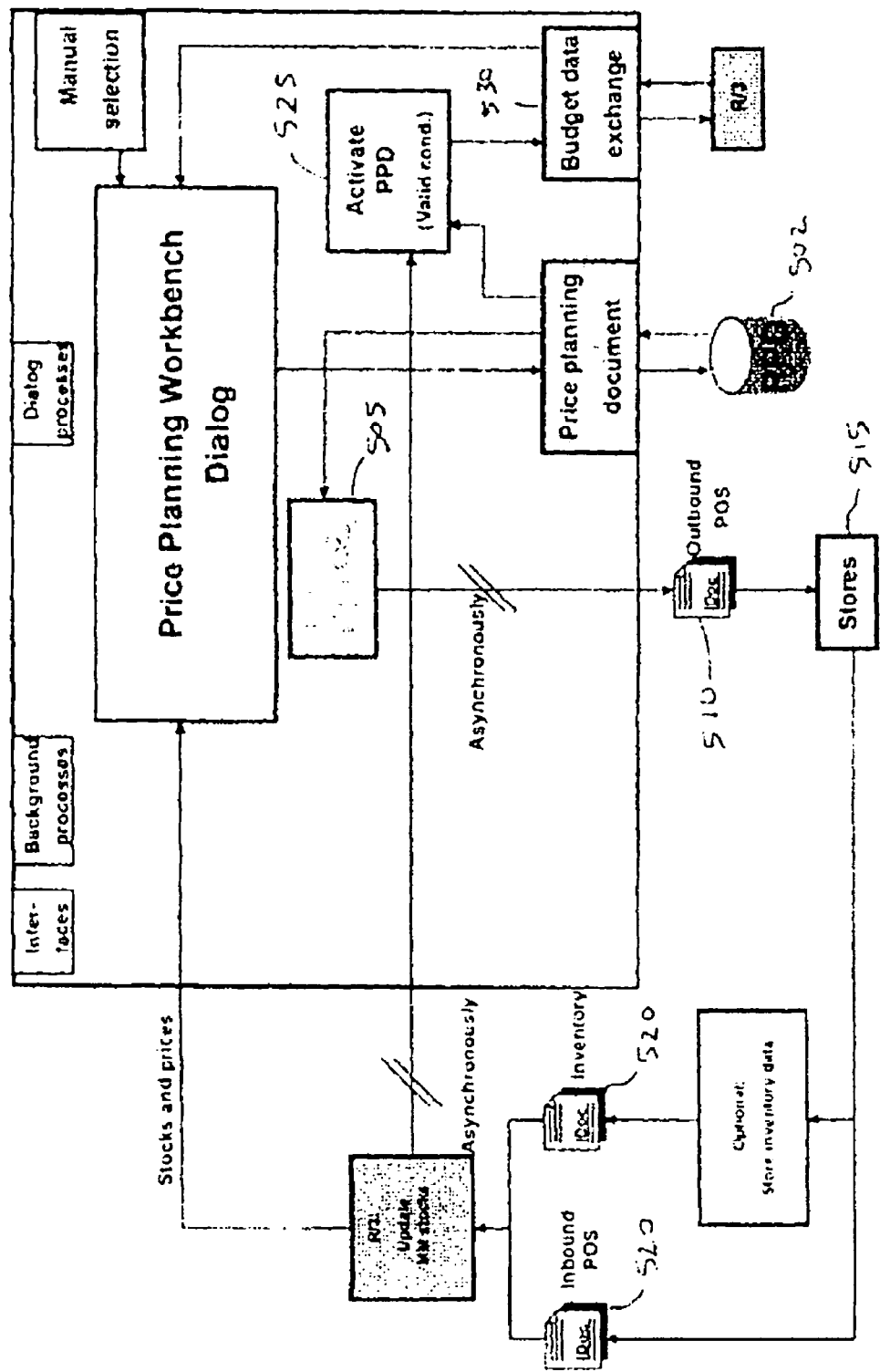
FIG. 5 is a detailed process flow block diagram illustrating an exemplary embodiment of a method for processing a price planning document to implement one or more price changes contained in the price planning document.

Referring now to FIG. 5, a more detailed block diagram illustrates an exemplary embodiment of a method for processing a planning document 502 to implement one or more price changes in retail planning system 100. Price planning system 130 may be configured to implement price planning document 502 through communication with one or more additional systems. The additional systems may include cash register systems, inventory systems, budgeting systems, etc.

According to an exemplary embodiment, price planning system 130 may be configured to create new price 505 from price planning document 502. In addition, price planning system 130 may be configured to generate one or more importation documents 510. Outbound documents 510 may be contain price change information for use in cash register systems at retail locations 515. Transfer of documents 510 to the cash register systems at retail locations 515 may be implemented utilizing converter software. Thus, documents 510 may be used to provide automatic, asynchronous generation of price change information for supply to the cash register systems. The cash register systems can be any type of POS or store management system.

In an exemplary embodiment, retail planning system 100 may be configured to provide automatic, asynchronous updates 525 of price planning document 502 that will become valid using the planned quantities from the promotion or current stock data. Retail planning system 100 may further be configured to update a budget associated with price planning document 502 in a step 530.

Figure 6:
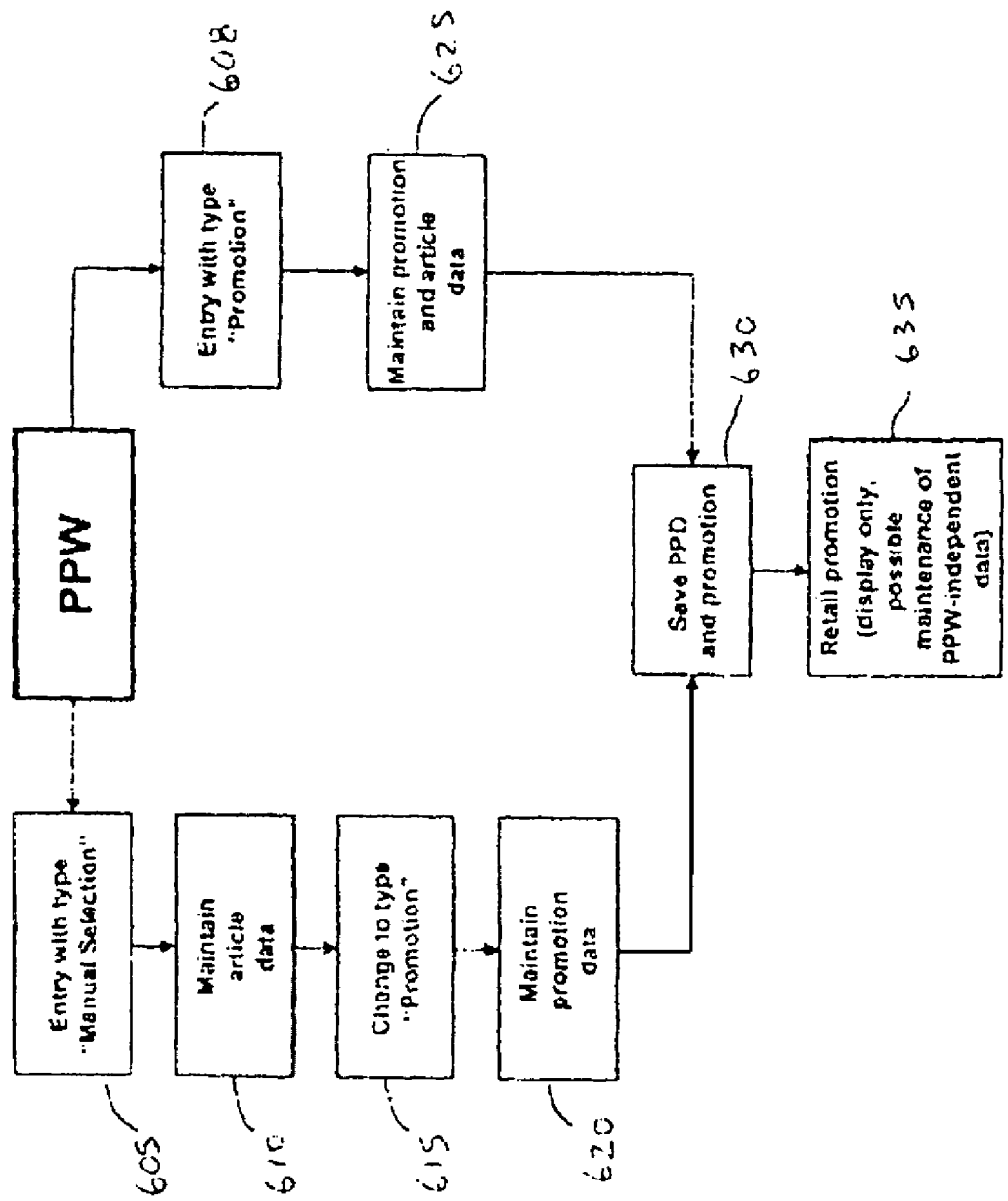
FIG. 6 is a flowchart illustrating an exemplary embodiment of a method for creating a promotion within price planning system.

Referring now to FIG. 6, a process flow diagram illustrates the two above-mentioned exemplary embodiments of a method for creating a promotion within price planning system 130. According to one such embodiment, a user utilizes interface 138 to indicate that a manual price change selection will be used to create a promotion as indicated by a step 605.

According to the other embodiment, the user indicates that a promotion will be entered directly by a step 608.

Where a manual input selection is made in step 605, article data may be loaded into the edit area of user interface 138 to enable a user to manually edit pricing and/or article data in a step 610. Manually editing pricing and/or article data may include manually entering price changes, timing information, article selections, etc.

Following manual editing in step 610, a user may utilize interface 138 to create a promotion based upon the manually edited data in a conversion step 615. Upon creation of the promotion, the user may utilize interface 138 to modify information related to the promotion to be created in a step 620. Modifying information related to promotion may include changing one or more articles included in the promotion, timing information, sources included in the promotion, etc.

Where a selection is made to directly enter a promotion in step 608, a promotion may be created in a step 625. Creation of the promotion in step 625 may include loading of article and/or promotion data to the edit area of user interface 138 for manipulation by the user. For example, the user may use the edit area to make changes related to the articles and/or changes related to data for the promotion.

Following creation of a promotion and related article data in steps 620 or 625, price planning system 130 may be configured to create a price planning document and a promotion in a step 630. The price planning document may be distributed and maintained in a step 635 as described above with reference to FIG. 5.

Price planning system 130 may further be utilized to modify and/or control an existing promotion. Modifying and/or controlling an existing promotion may include various activities such as deactivating individual sale prices of an ongoing promotion, reactivating individual sale prices of an ongoing promotion, deactivating a complete promotion, reactivating a complete promotion, adding articles to a promotion, ending a promotion prematurely, extending the validity of an ongoing promotion, changing the sale prices of an ongoing promotion, and so on.

Figure 7:
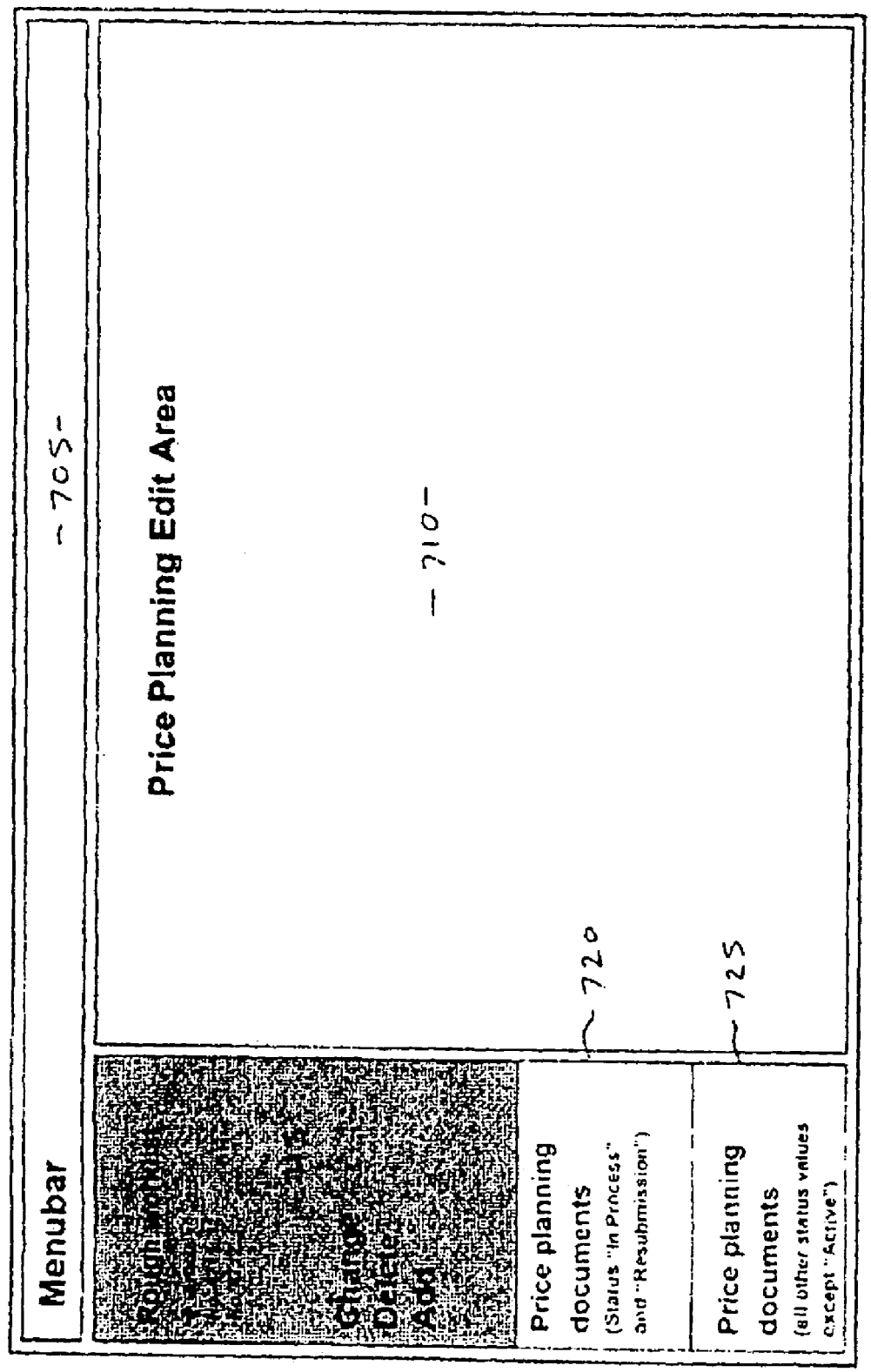
FIG. 7 is a block diagram illustrating an exemplary embodiment of a user interface for the price planning system.

Referring now to FIG. 7, a block diagram illustrates an exemplary embodiment of a user interface 138 for price planning system 130. User interface 138 may include a menu bar 705, a price planning editing area 710, a rough worklist area 715, and an active listing area 720 for price planning documents with a status such as "in process" or "resubmission." Further, user interface 138 may also include an inactive listing area 725 for price planning documents with a status such as "for release", "released", "conditions created", "partially active", and "cancelled".

Menu bar 705 may contain a plurality of icons that allow a user to navigation and perform functions within price planning system 130 and other systems associated with price on system 130. According to an exemplary embodiment, menu bar 705 contains icons configured to allow a user to select various functions and data Price planning editing area 710 may provide an overview screen of all previously selected articles for which the user may desire to implement price changes. According to an exemplary embodiment, each article may be displayed and aggregated into organizational levels based on a sorting criteria such as article type, article price, article location, timing information, etc., within editing area 710. Any additional or enhanced data associated with the article may also be displayed. The additional data may be obtained from data warehouse 120 or another source.

Price planning editing area 710 may also be configured to allow a user to open a detail view for an article. According to an exemplary embodiment, the detailed view may allow three possible price activation levels (e.g., distribution chain, price list, and store) to be displayed.

Price planning worklist area 715 may be configured to display the rough worklist of selected articles for which price changes may be made. The rough worklist may be displayed in a hierarchical structure according to an article hierarchy or a merchandise group hierarchy. According to an exemplary embodiment, the user may select articles from within the rough worklist to transfer the articles to price planning editing area 710. The transfer of articles from area 715 to area 710 may be implemented by selecting the articles, dragging and dropping the articles, double-clicking on the articles, etc.

Active listing area 720 may be listing of all active price planning documents which a user may edit. When a price planning document is selected from active listing 720, price planning system 130 may be configured to display the worklist associated with that price planning document in price planning worklist area 715. At the same time, price planning system 130 may also display articles associated with the price planning document in price planning editing area 710.

Inactive listing area 725 may be a listing of all inactive price planning documents which a user may not edit. Price planning system 130 may be configured such that the user can access but not modify the information in the price planning documents within inactive listing 725. Accordingly, a user may review these existing price planning documents for informational purposes.

Figure 8:
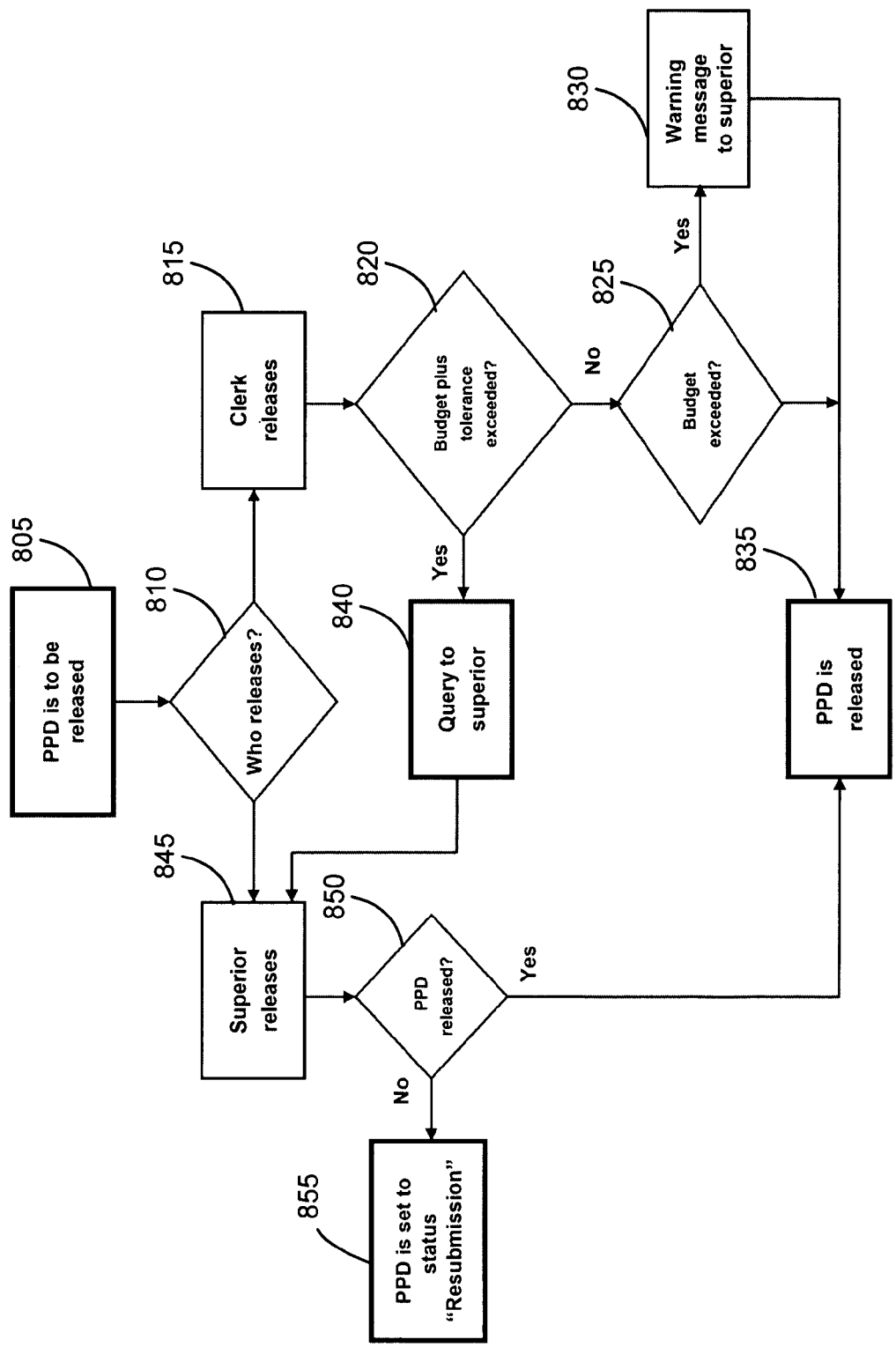
FIG. 8 is a flowchart illustrating an exemplary embodiment of a method for implementing a price planning schedule contained within a price planning document.

Referring now to FIG. 8, a process flow diagram illustrates an exemplary embodiment of a method for implementing a price planning schedule contained within a price planning document. According to an exemplary embodiment, a price planning document may require approval and authorization before a price planning schedule contained in the price planning document may be implemented. As explained below, pricing implementation engine 140 may be configured to implement an automated approval and authorization process for this purpose. Advantageously, the automated process may prevent the activation of unauthorized price plans while ensuring that authorized changes can be implemented as quickly as possible to, for example, react to worse-than-expected sales.

In a step 805, a price planning document to be released is received by pricing implementation engine 140. Upon receipt, pricing implementation engine 140 may make a determination in a step 810 whether the price planning document should be released by a clerk or a superior. In the former case, when a clerk releases the price planning document in a step 815, a determination is made in a step 820 whether a budget plus a tolerance value has been exceeded based upon the release of the price planning document. If the budget plus a tolerance value has not been exceeded, a determination is made whether the budget has been exceeded in a step 825. If the budget has been exceeded, a warning message is sent to the superior in a step 830. If the budget has not been exceeded, or following transmittal of the warning message to the superior in step 830, the price planning document is released in a step 835.

Where the budget plus tolerance has been exceeded in step 820, a query may be transmitted to the superior in a step 840. Where it is determined in step 810 that a superior should release the price planning document, or where the query has been sent to the supervisor from step 840, the superior releases the document in a step 845. In a step 850, a determination is made whether the price planning document should be released by pricing implementation engine 140. If engine 140 determines that the price planning document should not be released, the price planning document is set to status "resubmission" in a step 855. If engine 140 determines that the price planning document should be released, the price document is released in step 835.

Figure 9:
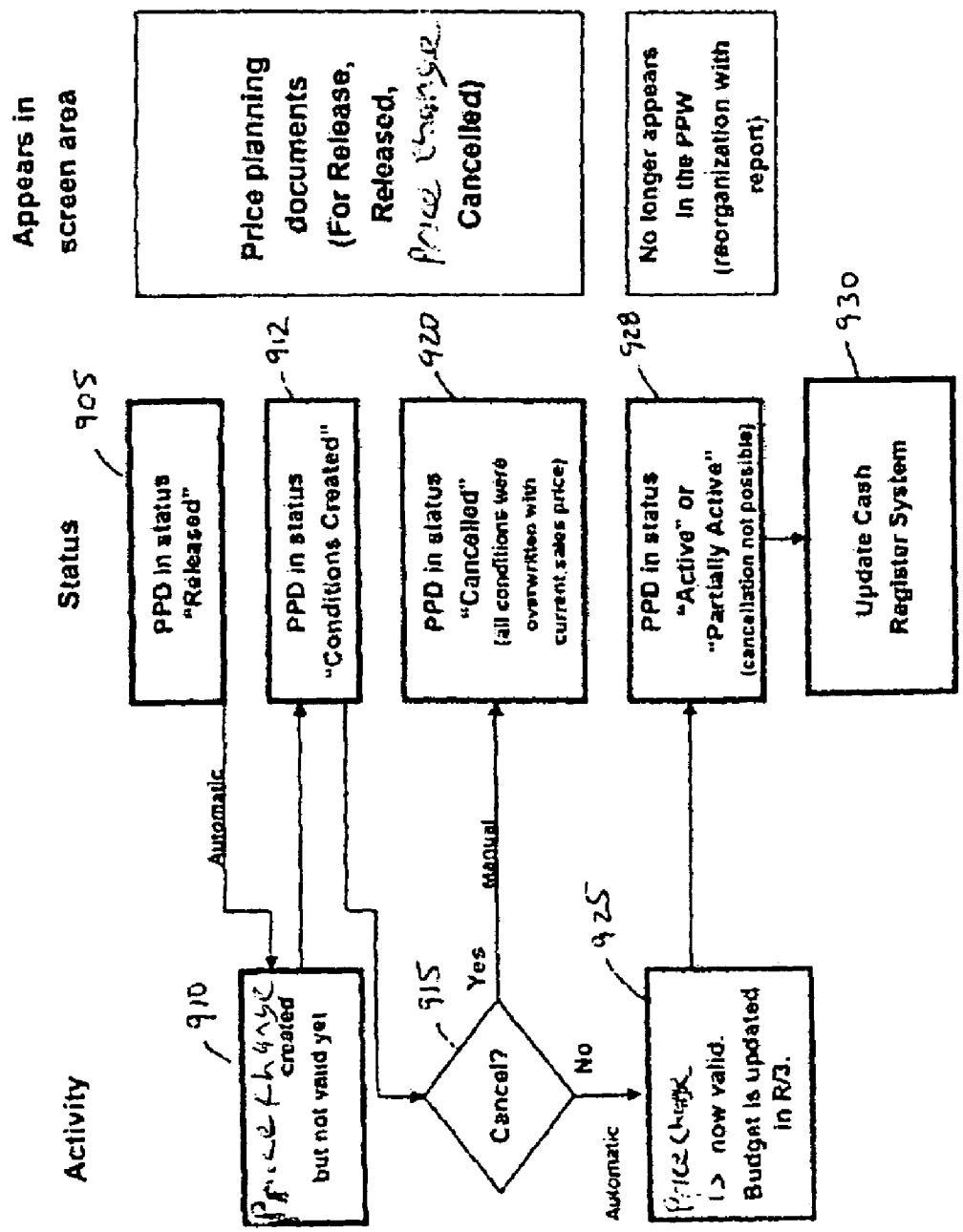
FIG. 9 is a flowchart illustrating an exemplary embodiment of a method for managing the status of a price planning schedule within a price planning document following release of the price planning document.

Referring now to FIG. 9, a process flow diagram illustrates an exemplary embodiment of a method for managing the status of a price planning schedule within a price planning document following release of the price planning document. In a step 905, a price planning document that has been approved for release is set to status "released". Following release of the price planning document, a determination is made whether price changes (new prices) have been created but are not yet valid in a step 910 and the price planning document is set to status "price change" in a step 912.

As long as the conditions are not yet valid, price planning system 130 may be configured to allow a user to cancel the price planning document at any time in a step 915. If a user manually cancels the price planning document, the price planning document is set to status "cancelled" in a step 920.

If the user does not cancel the price planning document, a determination is made in a step 925 whether the price changes are now valid. If the price changes are valid, the budget is updated in step 925 within retail planning system 100, and the price planning document is set to status "active" or "partially active" in a step 928.

According to an exemplary embodiment, price planning system 130 may be configured to transmit activated sales prices to cash register systems affected by the price changes in a step 930. Transmittal of the activated sales prices may occur manually or automatically based on periodic updates, validation of the conditions, etc.

Although the terms "article," "product," "retail product," and "inventory" are used herein to refer to the merchandise being sold, the present description will be applicable to the sale of any type of good or service. In either case, the pricing for merchandise being sold and/or services may be controlled or affected by the price planning system as described above.

Figure 10:
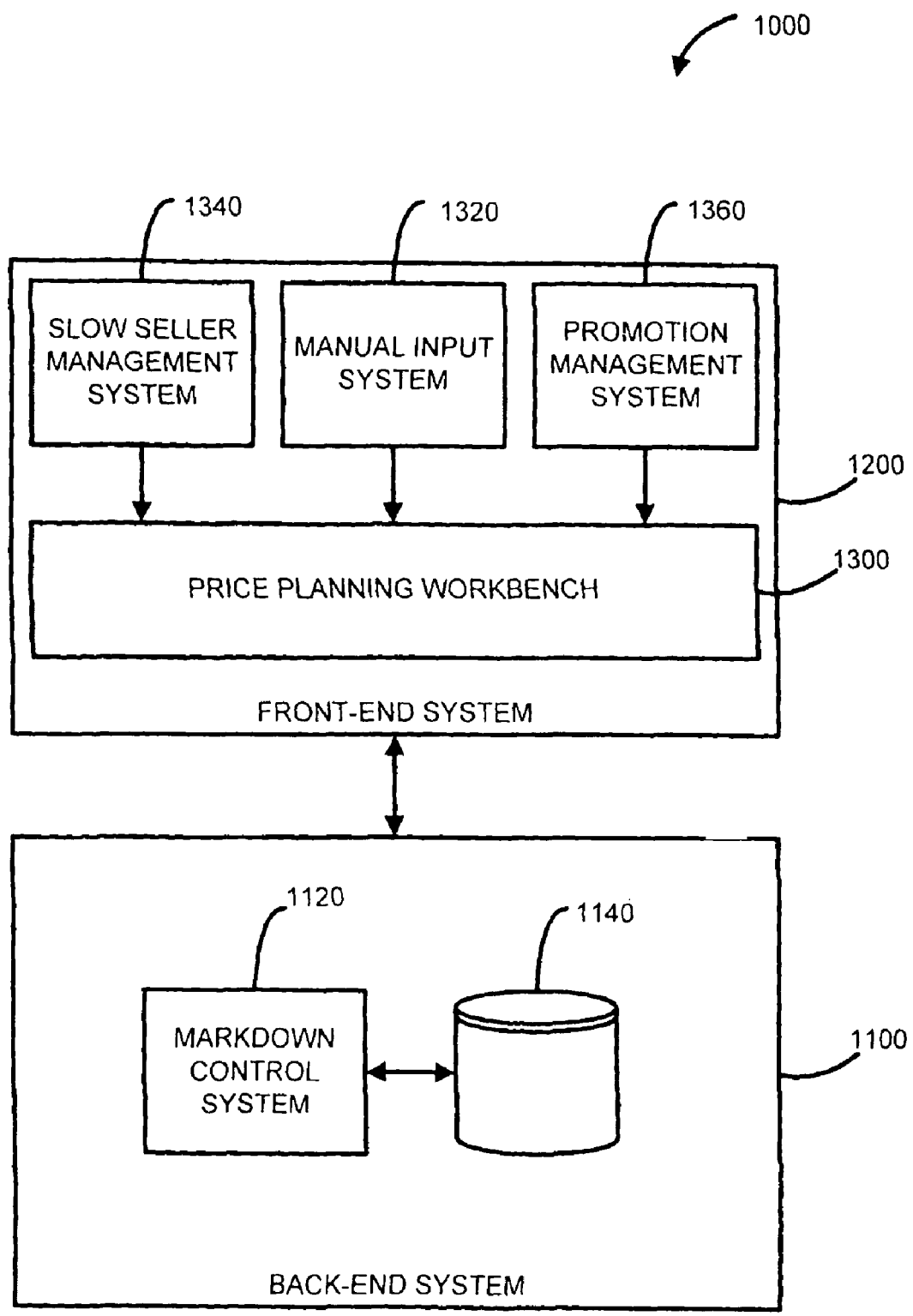
FIG. 10 is a general block diagram illustrating a system for processing data related to operations and planning for selling goods and services according to another exemplary embodiment.

FIG. 10 illustrates a system 1000 for processing data related to a sales of goods and services in accordance with another exemplary embodiment. The data can be related products or services that are being or planned to be sold. System 1000 is similar to system 100 described with reference to FIGS. 1-10. According to an exemplary embodiment, system 1000 is configured for a retail sales promotion. System 1000 includes a back-end system 1100 and a front-end system 1200. System 1000 may be implemented as a single system, a distributed system, or any combination thereof. System 1000 may be implemented using a single computing system, a plurality of computing systems; software, hardware, or any other system or combination of systems to perform the functions described herein. System 1000 may be used, for example, to define and implement a retail sales promotion based on a hierarchical product structure. System 1000 can correspond to promotion management 136 engine in FIG. 1.

Back-end system 1100 is a data repository configured to receive, sort, process, and store retail sales data, as well as to facilitate planning, provide reporting, and provide other functions associated with managing retail sales data using one or more functions and/or components. Back-end system 1100 may further include one or more functions associated with it to permit a user to efficiently organize and retrieve stored data. For example, in the illustrated embodiment, back-end system 1100 further comprises a markdown control function 1120 and storage 1140. Back-end system 1100 may be implemented using single or multiple systems. Preferably, back-end system 1100 is one or more databases provided by SAP.

Markdown control function 1120 is configured to monitor sales data for particular products and inventory and determine a specific price reduction according to an associated markdown profile when, for example, actual sales data deviates from target sales data for those products. Accordingly, markdown control function 1120 may generate a hierarchical list including products or inventory that, for example, is selling at a slower rate than forecast. The hierarchical list may then be provided to front-end system 1200 to, for example, initiate a customized promotion to reduce prices and increase sales of the identified products. The hierarchical lists may include any type classifications that are desirous of the user.

Figure 10A:
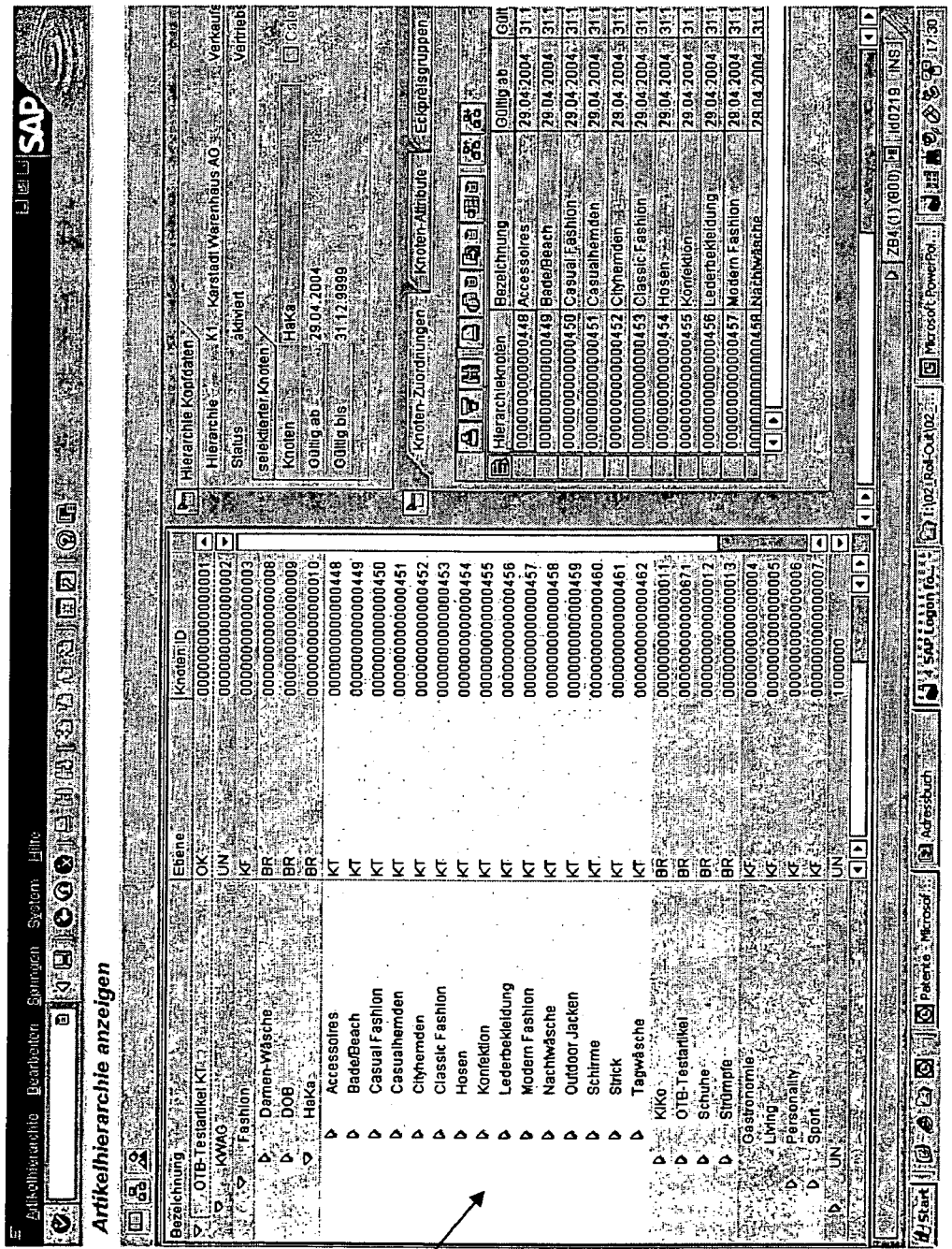
FIG. 10A is a screen drawing of an article or product hierarchy work area.

With reference to FIG. 10A, article hierarchies can be shown in a tree structure 313B. The article hierarchies can include designations such as, fashion, which in turn includes groups of articles by store, by department, by division, by more detailed definition of the article, etc. For example, fashion can include groups of articles, including men's wear, ladies' wear, casual wear, beach wear, etc. Further, these articles can be arranged underneath a type of department for the store which is under the fashion category. In another embodiment, the groups of articles by store can include a list of types of articles, such as beach, casual, outdoor, etc. These article hierarchies can be arranged in a variety of ways for viewing on a display.

Articles can be selected according to the designation discussed above. An identifier for each designation can be used to track other data about the designation including date ranges for the article's budgets, etc.

The hierarchical lists are not limited to work lists and can include other criteria. Although not described as an entirely automated process for generating promotions, an entirely automated system is also envisioned by this application. The promotions can also be initiated through manual input Front-end system 1200 is configured to allow one or more users to perform one or more functions, such as retail price planning functions, associated with system 100. Front-end system 1200 includes Price Planning System (PPW) 1300 which is similar to price planning workbench 130 in FIG. 1. According to alternative embodiments, front-end system 1200 may include additional, fewer, and/or different functions related to retail price planning. The described functions may be implemented using hardware, software, integrated circuits or any system configured to perform the functions described herein Price planning system 1300 may be any system configured to facilitate price planning for one or more products within a retail operation. According to an exemplary embodiment, price planning system 1300 includes manual input system 1320, slow seller management system 1340, and promotion management system 1360. According to alternative embodiments, price planning system 1300 may further include additional, fewer, or different systems to facilitate creation, processing, and maintenance of purchase orders. Further, functions associated with one or more systems may alternatively be associated with one or more alternative systems.

Manual input system 1320 is a system configured to allow a user to override automated procedures associated with system 1000. For example, a manager of a particular retail outlet may have knowledge, such as a knowledge of a local fashion trend, indicating that following an automated retail pricing procedure would be detrimental to the retail operation. Manual input system 1320 would allow the manager to override the automated pricing procedure by, for example, determining an alternative price for articles or merchandise related to the trend.

Slow seller management system 1340 is a system configured to communicate with one or more of, for example, a budgeting system, a planning system, an inventory system, and/or any other systems within system 1000, such as markdown control system 1120. Slow seller management system 1340 is configured to identify and recommend markdown or other pricing strategies for a hierarchical list of products or inventory that is selling at a slower rate than forecast. For example, in one embodiment, the pricing strategy may include recommended percentage markdowns and/or retail sales promotions to increase sales rates and reduce inventory of certain products or inventory Promotion management system 1360 is a system configured to define and/or implement a retail sales promotion for one or more products based on historical or real-time data related to those products. For example, in one embodiment, markdown control system 1120 and/or slow seller management system may identify one or more products that are selling at a slower rate than forecast. Accordingly, markdown control system 1120 and/or slow seller management system 1320 may identify those products to promotion management system 1360 in the form of a hierarchically structured product list to initiate a promotion to increase sales of the identified products. Promotion management system 1360 may then be used to define and/or implements a retail sales promotion for products at any level of the list hierarchy. In one embodiment, promotion management system 1360 automatically defines and implements a retail sales promotion for products in the hierarchical product list. In another embodiment, front-end system 1200 presents the hierarchical product list to a user to select products from the list to define the retail sales promotion, as well as markdown or price reduction and validity periods for the retail sales promotion.

Figure 11:
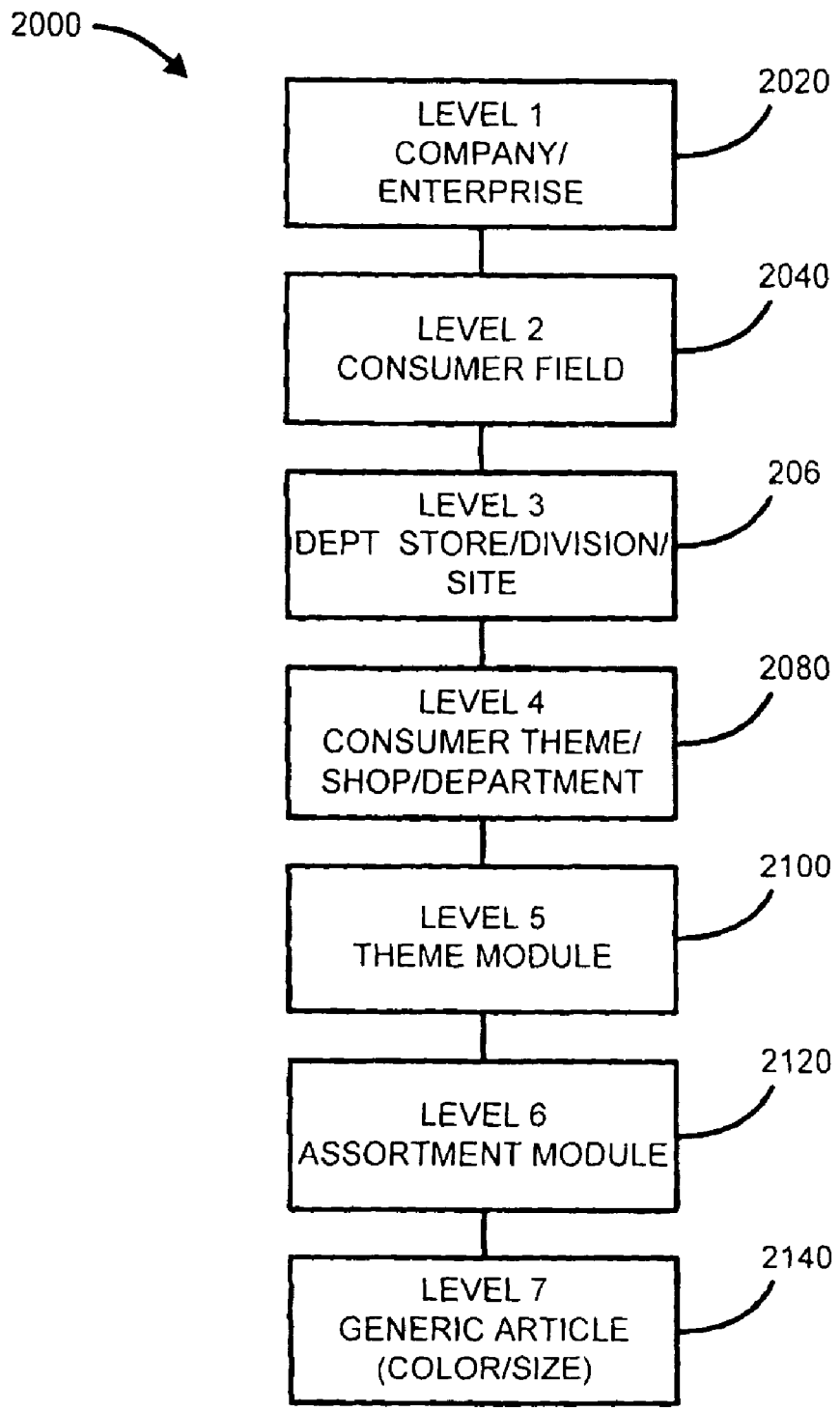
FIG. 11-11A are general block diagrams illustrating a product hierarchy structure according to an exemplary embodiment.

FIG. 11 illustrates a product hierarchy structure 2000 according to one exemplary embodiment. Product hierarchy structure 2000 is a data structure comprising multiple levels of abstraction which may be used to group an aggregation of products hierarchically in a sales-oriented structure. For example, in one embodiment product hierarchy structure 2000 may be used to group an aggregation of retail sales items, such as different types of fashion merchandise articles including shoes, trousers, and shirts, into a sales oriented structure.

Product hierarchy structure 2000 may include any suitable number of levels to achieve the desired degree of flexibility or sophistication of product or sales groupings for an aggregation of products. For example, in the illustrated embodiment, product hierarchy structure 2000 includes at least seven levels arranged in ascending order according to the level of product detail. A first and highest level 2020 may correspond to a "Company" or "Enterprise" level, which may represent, for example, the top level in a sales organization. A second level 2040 may correspond to a "Consumer Field" level which may represent, for example, the most general classifications of products carried by the sales organization. A third level 2060 may correspond to a "Department Store" or "Division" or "Site" level which may represent, for example, each particular department store location in the sales organization. A fourth level 2080 may correspond to a "Consumer Theme" or "Shop" or "Department" level, which may represent, for example, departments within differing product themes within a particular department store. A fifth level 2100 may correspond to a "Theme Module" level which may represent, for example, different product types within each department. A sixth level 2120 may correspond to an "Assortment Module" level which may represent, for example, different groupings of each product type, such as ranges of colors or sizes in the case of fashion merchandise. A seventh level 2140 may correspond to a "Generic Article" level, which may represent a specific product or article according to, for example, its color or size. In other embodiments, additional or fewer levels of differing scope may be used in product hierarchy structure 2000.

Figure 11A:
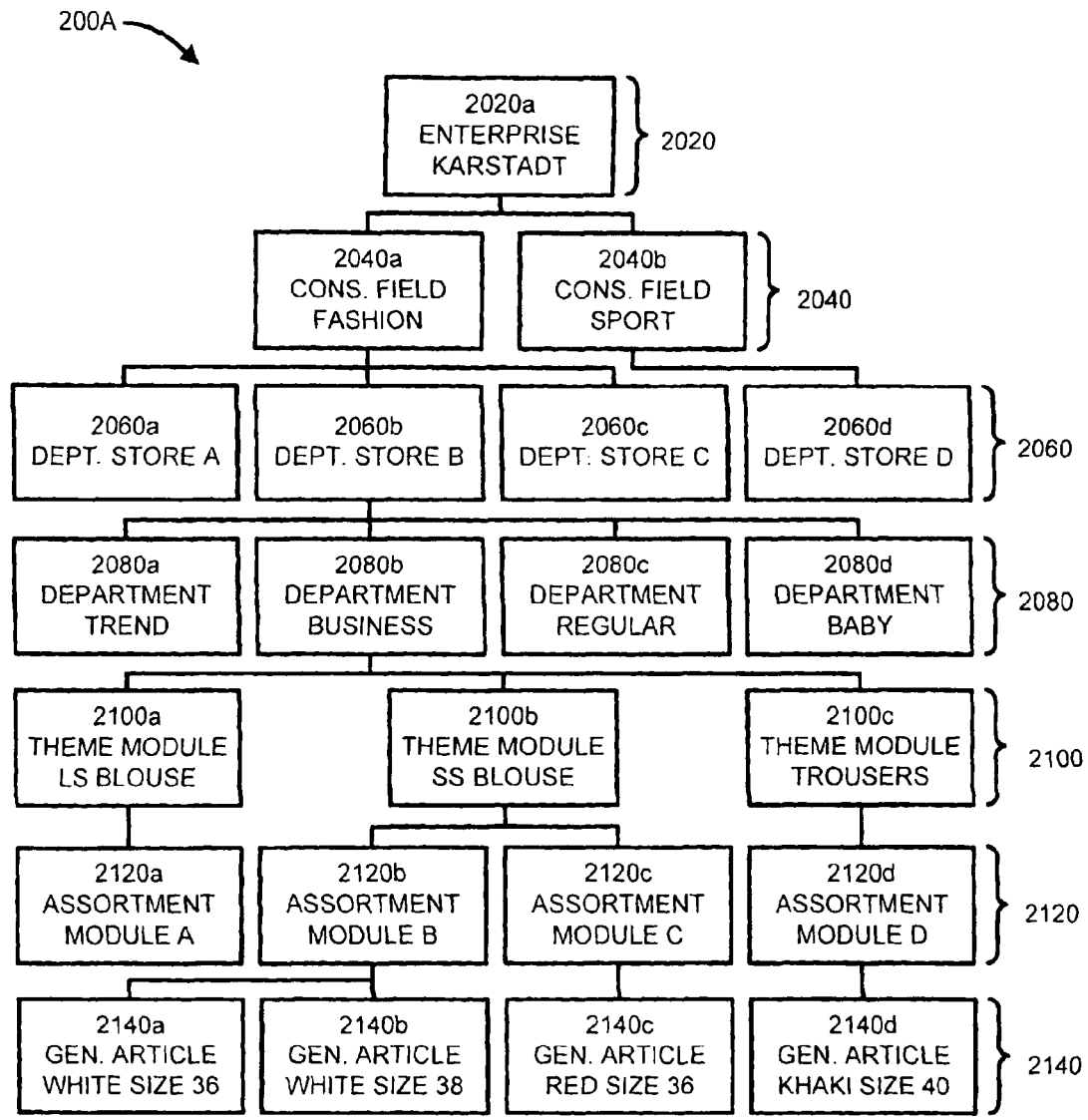

Product hierarchy structure 2000 may include any suitable number of product groupings or classifications in each level to achieve the desired degree of flexibility or sophistication of product or sales groupings. For example, FIG. 11A illustrates an embodiment 2000A of product hierarchy structure 2000 in which first level 2020 includes grouping 2020a which may represent the top level in the department store sales organization. Second level 2040 includes groupings 2040a and 2040b, which may represent general classifications for "Fashion" and "Sports" products carried by department store. Third level 2060 includes groupings 2060a, 2060b, and 2060c, which may represent department store's specialty stores which carry the department store's fashion products. Third level 2060 also includes grouping 2060d, which may represent department store D which carries the department store's sports products. Fourth level 2080 includes groupings 2080a, 2080b, 2080c, and 2080d which may represent "Trend," "Business," "Regular," and "Baby" departments in fashion department store B. Fifth level 2100 includes groupings 2100a, 2100b, 2100c, and 2100d which may represent product types for long-sleeve blouses, short sleeve blouses, and trousers carried in the business apparel department of fashion department store B. Sixth level 2120 includes grouping 2120a which may include assortment module A of different sizes and colors of long-sleeve blouses. Sixth level 2120 also includes groupings 2120b and 2120c which may represent assortments B and C of different sizes and colors of short-sleeve blouses. Sixth level 2120 also includes grouping 2120d, which may represent assortment module D of different sizes and colors of trousers. Seventh level 2140 includes groupings 2140a, 2140b which may represent generic articles contained in assortment module B, such as size 36 and size 38 white short-sleeve blouses. Seventh level 2140 also includes grouping 2140c which may represent a generic article in assortment module C, such as a size 36 red short-sleeve blouse. Seventh level 2140 also includes grouping 2140d which may represent a generic article in assortment module D, such as size 40 khaki trousers. In other embodiments, product hierarchy structure 2000A includes additional or fewer numbers of groupings of differing product type or scopes at each level.

Varying types of dependency structures may exist for product groupings on a particular level of product hierarchy structure 2000. In the embodiment of FIG. 11A, each product grouping on a particular level of product hierarchy structure 2000A corresponds to or depends from only one grouping on the next highest level, and may correspond to several groupings on the next lower level. For example, product groupings 2060a, 2060b, and 2060c on third level 2060 of product hierarchy structure 2000A each correspond only to grouping 2040a on the next highest level, i.e. second level 2040 of product hierarchy structure 2000A. Similarly, product grouping 2060d on third level 2060 of product hierarchy structure 2000A corresponds only to grouping 2040b on second level 2040 of product hierarchy structure 2000A. Product grouping 2060b on second level 2040 of product hierarchy structure 2000A corresponds to product groupings 2080a, 2080b, 2080c, and 2080d on the next lowest level, i.e. fourth level 2080 of product hierarchy structure 2000A, while these product groupings correspond only to product grouping 2060b on second level 2040, which represents the next highest level of product hierarchy structure 2000A for these groupings. In other embodiments, each product grouping on a particular level of product hierarchy structure 2000A may correspond to or depend from multiple groupings on the next highest level, and may also correspond to multiple groupings on the next lower level.

Figure 12:
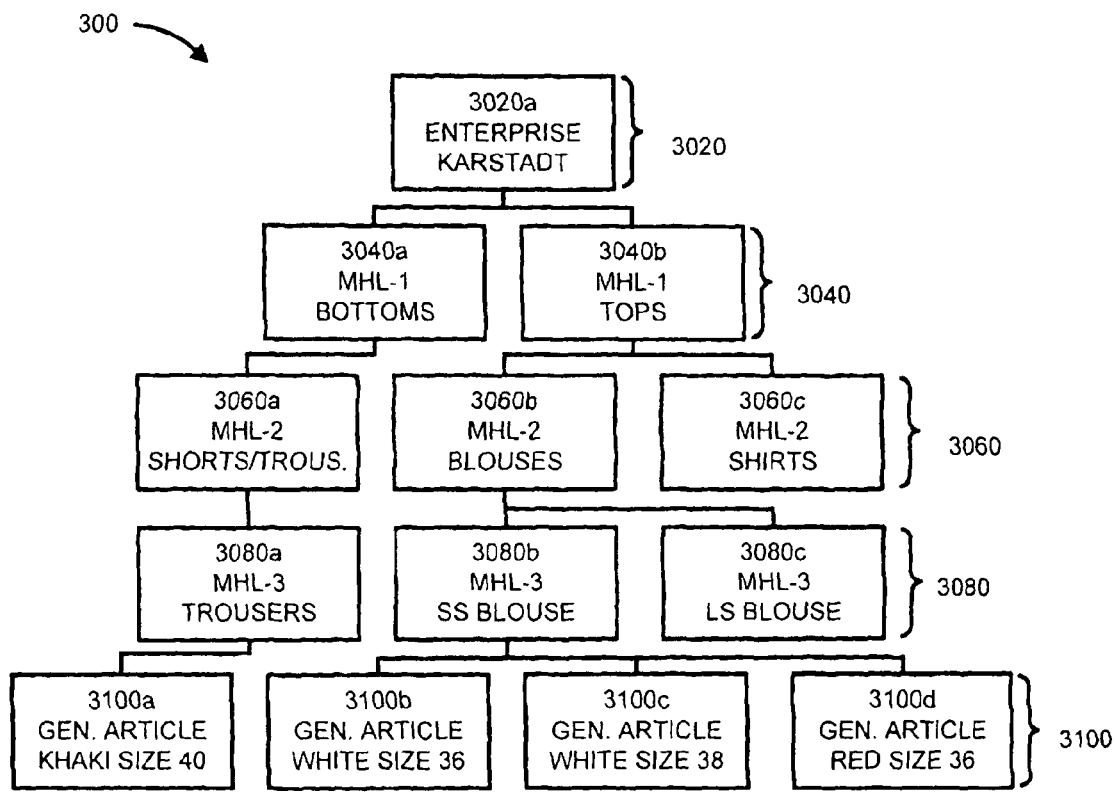
FIG. 12 is a general block diagram illustrating a product hierarchy structure according to another exemplary embodiment.

Product hierarchy structure 3000 is structured similarly to product hierarchy structure 2000 (shown in FIGS. 11 and 11A) in that product hierarchy structure 3000 may include any suitable number of levels or product groupings at each level, and may use varying types of dependency structures to achieve the desired degree of flexibility or sophistication of product or sales groupings for a particular aggregation of products. For example, in the embodiment illustrated in FIG. 12, product hierarchy structure 3000 includes at least five levels arranged in ascending order according to the level of product detail. A first and highest level 3020 may correspond to a "Company" or "Enterprise" level, which may include a grouping 3020a which represents department store. A second level 3040 may correspond to a first "Merchandise Hierarchy Level" which may include, for example, merchandise hierarchy groups 3040a and 3040b. Merchandise hierarchy group 3040a may represent a product group for "Bottoms," while merchandise hierarchy group 304b may represent a product group for "Tops." A third level 3060 may correspond to a second "Merchandise Hierarchy Level" which may include, for example, merchandise hierarchy group 3060a, which may represent a product group for shorts and trousers. Third level 3060 may also include merchandise hierarchy groups 3060b and 3060c, which may represent a product group for blouses and a product group for shirts. A fourth level 3080 may correspond to a lowest "Merchandise Hierarchy Level" which may include, for example, merchandise hierarchy group 3080a, which may represent a product group for trousers. Fourth level 3080 may also include merchandise hierarchy groups 3080b and 3080c, which may represent a product group for short-sleeve blouses and a product group for long-sleeve blouses. A fifth level 3100 may correspond to a "Generic Article" level which may include, for example, grouping 3100a, which may represent a generic article such as size 40 khaki trousers. Fifth level 3100 may also include groupings 3100b and 3100c, which may represent general articles such as size 36 and size 38 white short-sleeve blouses. Fifth level 3100 may also include grouping 3100d which may represent a general article such as a size 36 red short-sleeve blouse. In other embodiments, product hierarchy structure 3000 may include additional or fewer numbers of levels groupings of differing product type or scopes at each level, as well as different dependencies between groups on each level.

Figure 13:
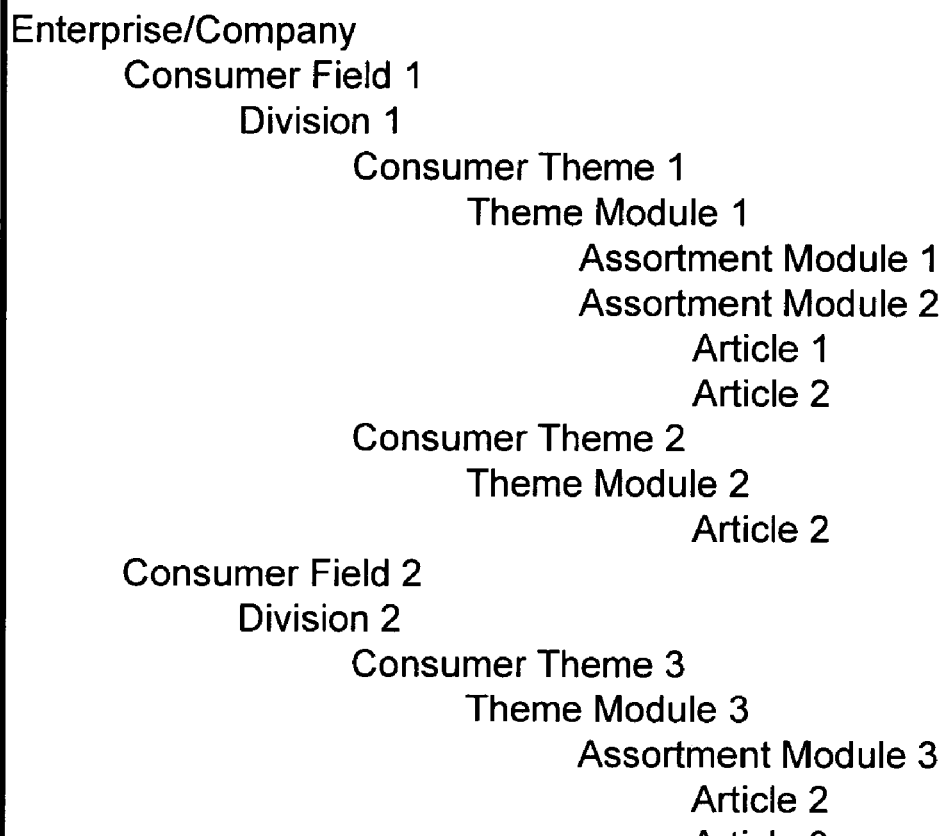
FIG. 13 illustrates a hierarchical product list based on a product hierarchy structure.

FIG. 13 illustrates a hierarchical product list 4000 based on, for example, product hierarchy structure 2000 (shown in FIGS. 11 and 11A). In one embodiment, hierarchical product list 4000 is provided by markdown control system 1120 to promotion planning system 1360 and displayed to user via price planning system 1300 and front-end system 1200. Hierarchical product list 4000 may be used to determine products to be included in a retail sales promotion. For example, in one embodiment the retail sales promotion may be determined by selecting any hierarchical product level in hierarchical product list 4000.

Figure 14:
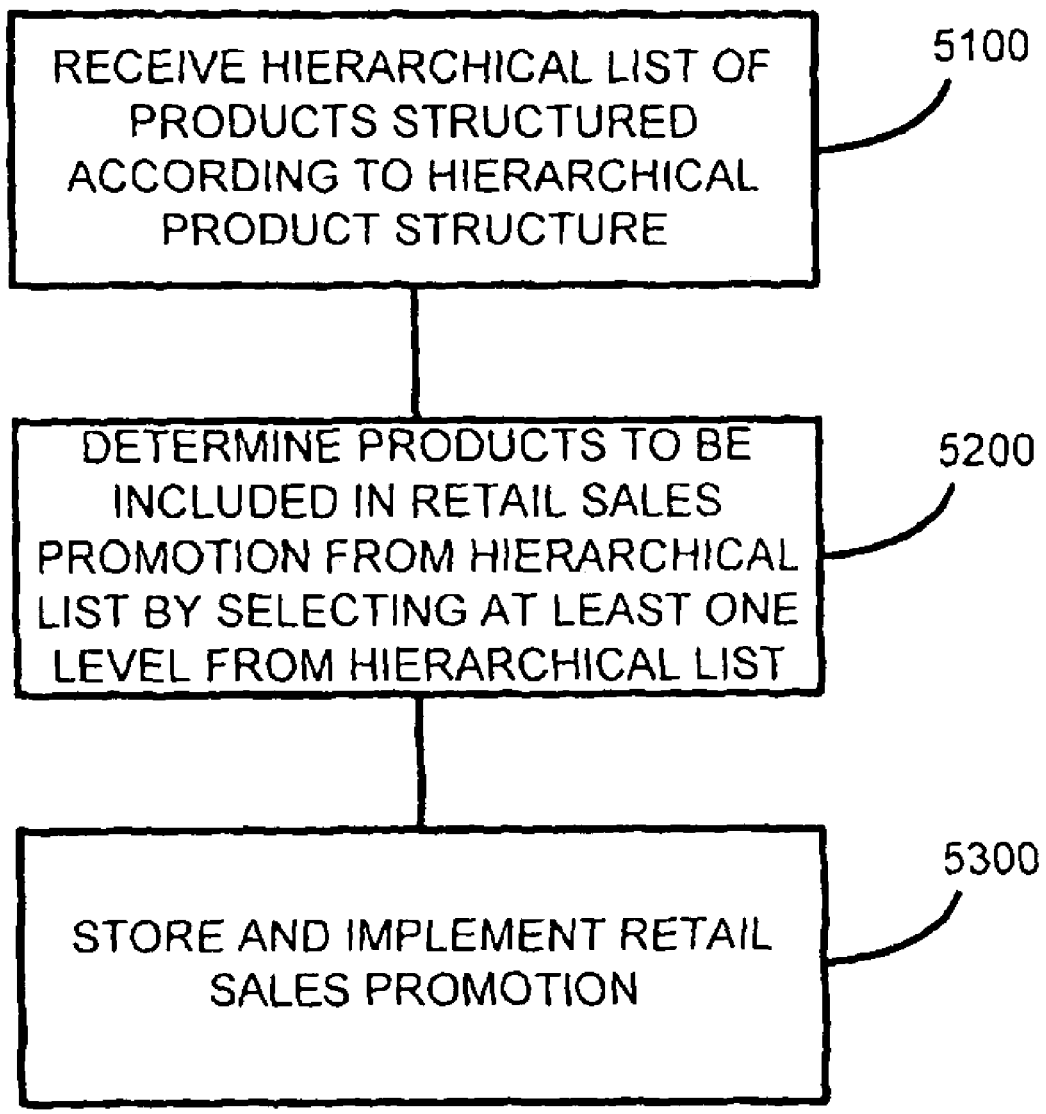
FIG. 14 is a flow diagram illustration a method for defining a retail sales promotion based on a product hierarchy structure according to an exemplary embodiment.

FIG. 14 illustrates a method for defining a retail sales promotion based on a product hierarchy structure according to an exemplary embodiment. The method begins at step 5100. At step 5100 a hierarchical product list (e.g., hierarchical product list 4000) is provided to, for example, promotion management system 1360 (shown in FIG. 10) or another system. The hierarchical product list may be 11A), product hierarchy structure 3000 (shown in FIG. 12) or another product hierarchy structure. The hierarchical product list includes, for example, a hierarchical list of products or inventory that is selling at a slower rate than forecast. At step 5200 a hierarchical grouping of products is determined from the hierarchical list. In one embodiment, the hierarchical grouping of products, is automatically determined from the hierarchical list by, for example, selecting the entire hierarchical list of products. In another embodiment, the hierarchical list of products is presented to a user to determine the hierarchical product grouping by, for example, selecting at least one level from the hierarchical list. At step 5300 the retail sales promotion is stored and implemented according to the defined hierarchical product grouping, markdowns, and periods of validity.

In this way, the number of retail sales promotions, as well as the scope of each promotion may be minimized and/or selectively defined according to sales performance of different products at a number of different levels within a sales organization, and within a number of specific product groupings. Accordingly, revenue reductions due to retail sales promotions are minimized and inventory reduction is improved.

"Article," "goods," "seasonal goods," "product," "retail product," and "inventory" are terms used herein to refer to the merchandise being sold, the pricing for which is controlled or affected by the retail sales promotion as used in the present description. It is envisioned that the present description will be applicable to the sale of any type of good or service.

Figure 15:
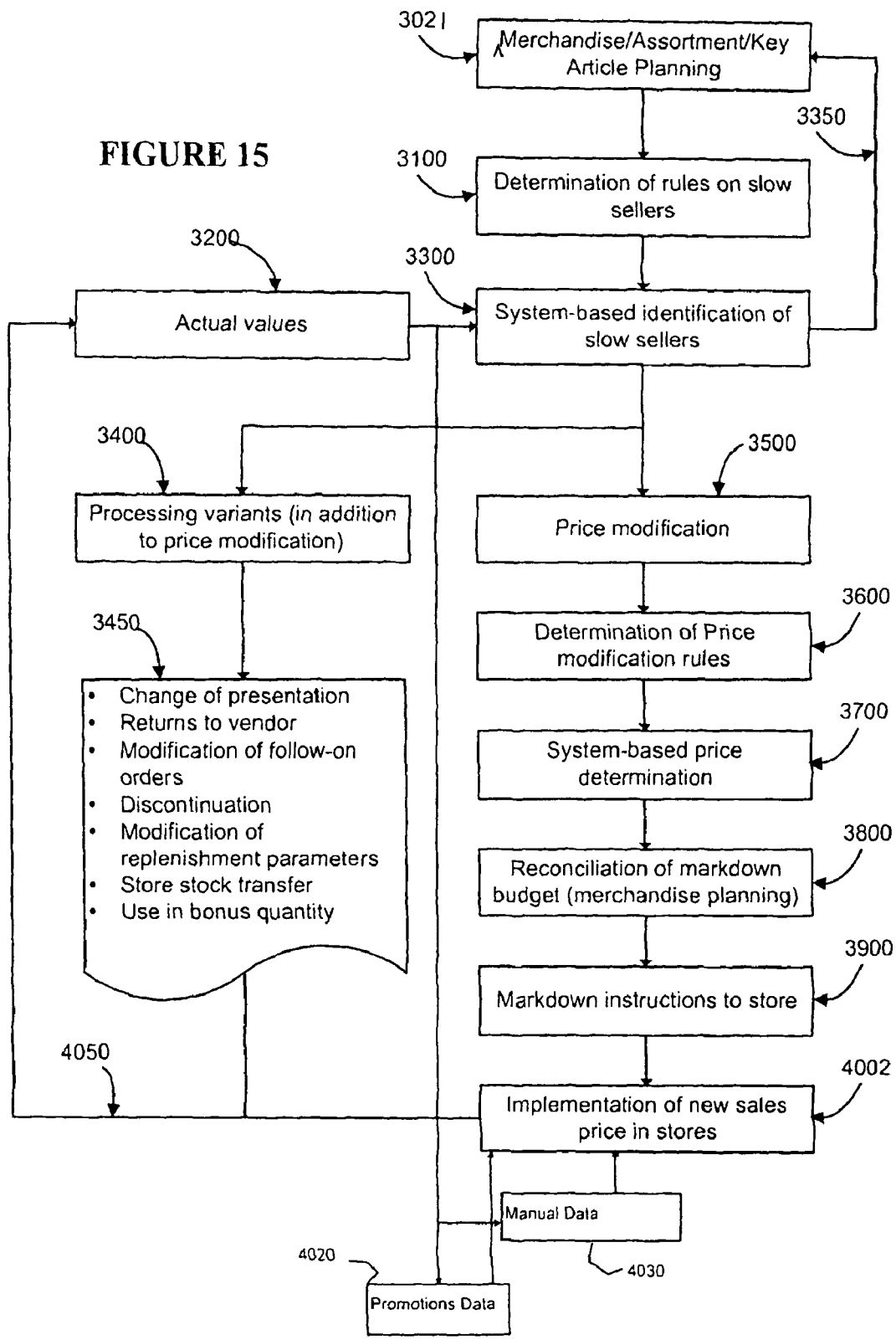
FIG. 15 is a flowchart illustrating a closed loop retail process using the systems illustrated FIGS. 1-14 according to yet another embodiment of the present invention.
Figure 16:
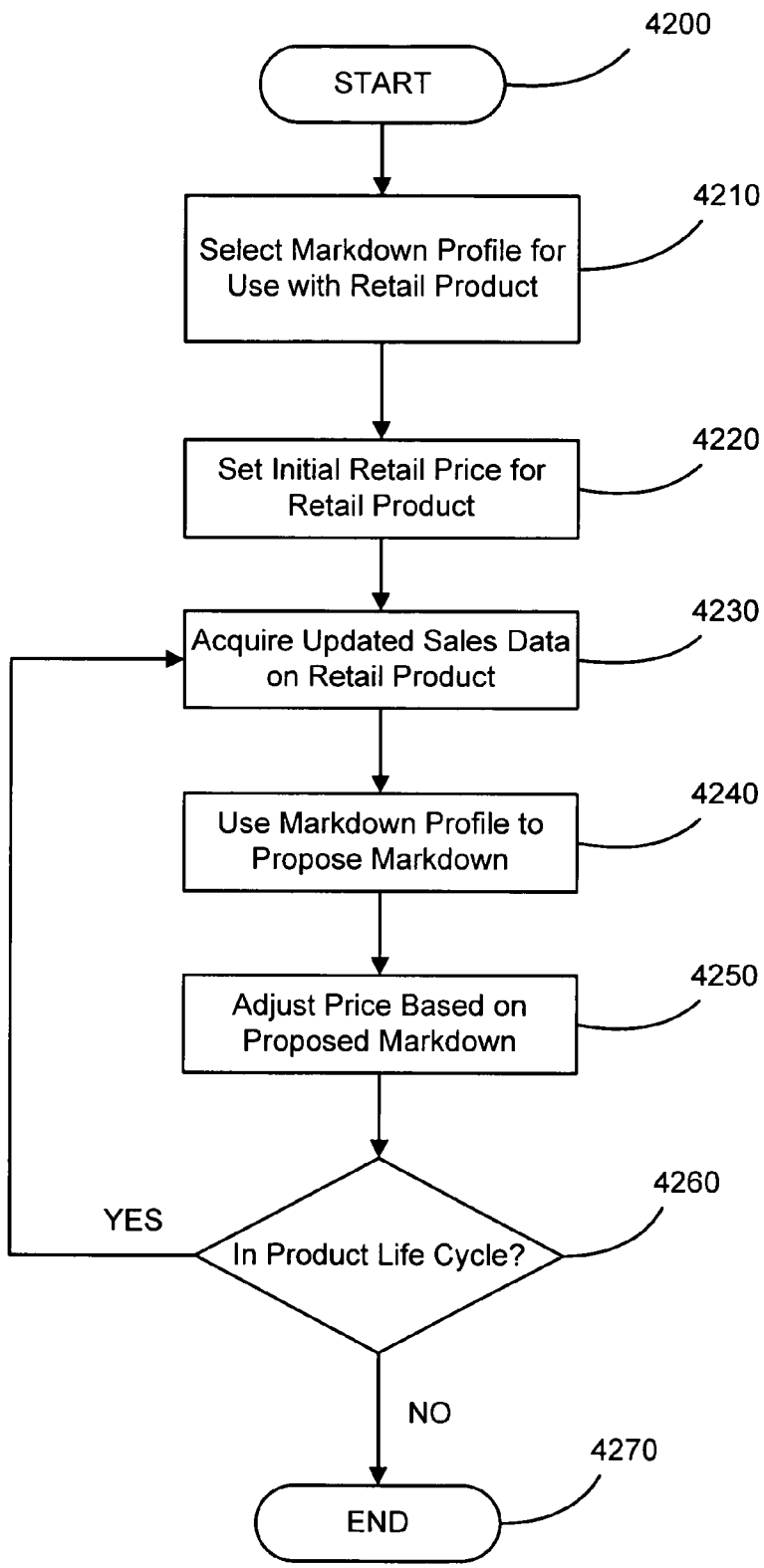
FIG. 16 is a flowchart illustrating basic price control and modification under an embodiment of the present invention.

With reference to FIGS. 15 and 16, a closed loop retail process in accordance with yet another exemplary embodiment of the present invention can utilize system 100 or system 1000. The closed loop retail system preferably implements new prices in accordance with manual data 4030, promotions data 4020 and markdown instructions 3900. Manual data 4030 can be provided by engine 134 or system 1320 (FIGS. 1 and 10), promotions data 4020 can be provided by engine 136 or system 1360 (FIGS. 1 and 10) and markdown data 3900 can be provide by engine 140 or system 1340 (FIGS. 1 and 10).

The closed loop retail method preferably identifies products or services that are selling more slowly than anticipated or that is selling at a pace where it becomes unlikely that a target sales quota will be reached. It is important to be able to identify such products and services quickly during a sales cycle and to take remedial measures to improve sales or minimize the negative effects of the lagging sales.

FIG. 15 is a flow chart illustrating closed loop retail method using automated markdown techniques, manual techniques and promotional techniques under an embodiment of the present invention. Slow seller management begins with merchandise and assortment planning as shown in a step 3002. Merchandise and assortment planning refer to the general distribution of products and services selected for marketing by a retailer or other entity. An assortment plan provides information such as the identification of the products and services, the quantities, the colors, the sizes, other characteristic traits, the location of products, the target customers, the time frame for marketing such products and services, the length of time they should be offered, anticipated sales curves, target inventory stocks, and costs incurred from inventory.

Initially, slow seller management is based on default values from the merchandise and assortment planning. The default values include inventory turnover, sales curves, target stocks, and costing incurred for a specific product or service or category of products or services. The next step in the slow seller management system and method is a determination of what set of rules to apply to determine slow sellers, shown as a step 3100 in FIG. 15. To determine a slow seller, that is a product or service that is selling more slowly than anticipated or too slowly to reach target quotas, it is envisioned that such information as past sales, inventory or stock values, and the accrued cost of inventory will be analyzed. Using such factors, slow sellers can be identified.

Of course, many different sets of rules using any combination of the above or other factors can be established. Indeed, different categories of products and services may have different sets of rules used to determine slow sellers. For a specific category of products or services, multiple sets of rules may be applied that vary depending on how aggressively the user wants to manage the inventory.

In addition, the determinations in step 3100 include determining the frequency with which the slow seller determination is carried out, the timing of such determination, and as briefly addressed above the determination of what indicators and what selection criteria to use.

A step 3200 in FIG. 15 shows the introduction of actual values, that is, the actual sales figures from the various stores (not shown), being introduced into the slow seller management system. These actual values are used in a step 3300 for the system to identify slow sellers based on the rules set forth in step 3100.

Once one or more slow sellers have been identified in step 3300, the slow seller management system and method proceeds to remedial measures to help increase sales of that products or service or to minimize the negative effects caused by the lagging sales. These remedial measures may include, as shown in a step 3400, a change in the presentation of such products or services, effecting returns of such products to vendors, modification of follow-on orders, discontinuation of the products or services, modification of replenishment parameters, transfer from one store to the other of existing inventory, etc.

In addition to the exemplary remedial measures discussed with respect to step 3400, the main remedial measure in slow seller management may be price modification as shown in step 3500. Price modification can be performed in place of or in addition to the remedial measures discussed with respect to step 3400. In accordance with an exemplary embodiment of the present invention, when a slow seller has been identified, active steps are taken to modify the price of the corresponding products and services in order to secure planned sales and reach targeted ending stock. Price modification is based on a set of previously defined rules that is used to determine the articles to be marked down, by how much, and the new sales price, taking into account existing prices. An example of a set of such markdown rules is the use of the markdown profile as described herein.

A step 3600 illustrates the determination of what price modification rules to apply. One example of this is the determination of what markdown profile to use based on what markdown profile or profiles have been assigned to the product or service in question that has been identified as a slow seller.

In a step 3700, the system makes a price modification determination based on the determined price modification rules, for example the markdown profile. The resulting impact on sales is then simulated using the modified pricing. These results are then reconciled with the markdown budget as described in greater detail in a later section herein and as shown in a step 3800. Upon reconciliation with the markdown budget, if it is determined that the price modification can be made in a step 3900, the markdown instruction is sent to the store or stores where the products or services are sold. In a step 4002, the modified pricing is implemented in the stores for subsequent sales of the products or services. The expectation is that the modified pricing will spur sales of the slow seller. Subsequent sales will affect the actual values being entered into the slow seller management system (engine 132 or system 1340), the promotions management system (engine 136 or system 1360), and the manual input system (engine 134 or system 1320) and cause a revision, if necessary, to the pricing, based on the rules and their application as set forth above.

A closed loop retail management process such as described provides several feedback loops that may be used manage slow sellers in both the current season and subsequent seasons. For example, the modified prices implemented in the stores in step 4002 may result in relatively rapid changes in actual values (e.g., increased sale quantities) which are provided by step 3200 to step 3300 for additional slow seller determinations in the current season. Further, engine 134 and system 1320 and engine 136 and system 1360 utilize the actual values for providing promotion data 4020 and manual data 4030 as shown in FIG. 15. This inter-seasonal feedback is indicated by a line 4050 between steps 4002 and 3200. Moreover, the results of slow management may also be incorporated into the planning for subsequent seasons. For example, when items sell slowly in one season it may be desirable to ordered smaller quantities of those articles for the next season. This intra-seasonal feedback is shown by a line 3350 between steps 3021 and 3300. Another feedback loop that may exist in an exemplary slow seller process is between markdown budget reconciliation step 3800 and slow seller rules determination step 3100. For example, the rules for slow sellers may be determined in step 3100 based in part on the amount or size of the available budget for markdown, which available budget may be impacted upon implementation of steps 3500-3800. Similarly, feedback is provided for data 4020 and 4030.

As mentioned above, one of the primary goals in managing seasonal merchandise and services is to limit markdowns to a minimum and to apply them at the best suitable time, while ensuring that nearly all the merchandise is sold by the end of the season. An advantageous tool or system is described herein that supports a pricing agent's work during the ongoing season, such as a retail season. The agent forms a correspondence between an article and a markdown profile. This markdown profile contains time-specific target data for selling an article during its retail life cycle. The sales data of an article that sold well in the previous year, for example, could be used as the target sales quota in a markdown profile. The markdown profile is tied to a pricing strategy, which dictates specific price reductions when the actual sales data deviates from the target data. As a result, the system is capable of monitoring the sales data automatically and notifying the agent of any exceptions that occur. In addition, the system can propose certain markdowns in order to reach the planned sales figures. In this approach, the agent is relieved from a large portion of the activities he or she usually has to perform. Using the markdown profile, the agent can obtain proposed markdowns for a given product at periodic intervals over the life cycle of the sale of that product. The agent can choose to accept or reject the proposals, but it is envisioned that in most cases, the proposals will be accepted and the goal of ensuring that nearly all the merchandise is sold by the end of the season is achieved.

FIG. 16 is a flow chart illustrating yet another embodiment of the present invention with a focus on markdown budget reconciliation. The flowchart begins at a step 4200. In a step 4210, the user or the system selects a markdown profile to be used for a retail product. In a step 4220, which may be performed before, after or contemporaneously with step 4210, the initial retail price of the product is set. A step 4230 illustrates the acquisition of updated sales data after some period of time has elapsed while the product has been on sale. This sales data is used in a step 4240 in the markdown profile to determine the proposed markdown for the retail product.

In the illustrated embodiment, before a proposed markdown is applied to adjust the retail price of a product, a reconciliation of the markdown budget is performed based on the proposed markdown. This is shown in a step 4245 in FIG. 16. During this reconciliation, the system determines whether, based on predetermined budget rules, a proposed markdown can actually be applied to adjust the retail price of a product. This determination is made based on whether application of the proposed markdown would result in exceeding the available markdown budget. The predetermined budget rules may include some tolerance factor such that if the budget is exceeded but within the tolerance, it would still allow the markdown to be applied.

If it is determined during reconciliation step 4245 that a proposed markdown can indeed be applied to the retail price of a product, the price is then adjusted based on the proposed markdown as shown in a step 4250. If it is determined during reconciliation step 4245 that a proposed markdown cannot be applied to the retail price of a product, then the proposed markdown is not applied to adjust the price of the product. In an alternate embodiment of the invention, the system would calculate the amount of markdown that could be applied while still complying with the predetermined rules regarding the available markdown budget. This allowable markdown could then be applied to adjust the retail price of the product.

In another embodiment of the invention, the proposed markdown is subject to approval or rejection by a user and, in the case of rejection, adjustment step 4250 need not be performed. In any event, the exemplary method returns to acquiring updated sales data in step 4230 so long it is still within the product lifecycle as determined in a step 4260. The frequency of acquiring updated sales data and determining a markdown can be adjusted by the user. In the preferred embodiment, it is performed once per posting period. Once the life cycle of the product has been exhausted, it is assumed that the product will not be offered for sale until some later time, if at all, and the use of the markdown profile is ended in a step 270.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

As noted above, embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

What is claimed is:

1. A price planning system comprising:
   a processor;
   a storage device comprising one or more non-transitory computer-readable media, the non-transitory computer-readable media comprising program code stored therein executable by the processor to implement:
   a price planning engine configured to receive a price planning input data, to receive a budget data, to generate a price planning schedule, and to implement the price planning schedule, the price planning schedule configured to include at least one price change and the price change includes at least one of a price change timing data, a quantity limiting data, an automatic implementation data, a manual implementation data, a product data, and a service data, the price planning schedule further configured to include a markdown budget, wherein the markdown budget represents a budgeted difference between a gross margin associated with an initial retail price and an actual margin associated with a final price after markdowns;
   a slow seller management system including a product hierarchy module, the slow seller management system is configured to determine a slow seller based on actual sales, a target quota, and at least one of a past sales data, an inventory data, and an accrued cost of inventory data, the slow seller is a product selling at a slower rate than targeted quotas, the slow seller management system is further configured to generate a slow seller price modification and an implementation time data related to the slow seller price modification, wherein the slow seller price modification is a reduction in a price of the slow seller responsive to the slow seller selling the slower rate than targeted quotas, the slow seller management system is configured to reconcile the markdown budget with the slow seller price modification to obtain either a first determination that the slow seller price modification may be implemented without exceeding the markdown budget or a second determination that the slow seller price modification may not be implemented without exceeding the markdown budget;
   an automated pricing engine is configured to implement the slow seller price modification based on the first determination;
   a manual pricing engine is-configured to implement the slow seller price modification based on a slow seller price modification cost exceeding the markdown budget and an approval signal from a user; and
   a price implementation engine is-configured to implement a markdown budget update module and an inventory tracking module based on the slow seller price modification;
   wherein the price planning engine is configured to utilize the slow seller price modification to determine a subsequent season plan, wherein the subsequent season plan includes a plan to order a smaller quantity of the slow seller for a subsequent season based on the slow seller price modification.

2. The system of claim 1, wherein the pricing implementation engine is configured to transmit the price planning schedule to one or more cash register systems to implement one or more slow seller price modifications in the price planning schedule.

3. The system of claim 2, wherein the pricing implementation engine is configured to transmit the price planning schedule based on the satisfaction of one or more conditions.

4. The system of claim 2, wherein the price planning schedule includes one or more slow seller price modifications for one or more products or services for sale at a retail location.

5. The system of claim 4, wherein the price planning schedule further includes a time period associated with the one or more slow seller price modifications.

6. The system of claim 5, wherein the slow seller management engine is configured to generate and modify a markdown profile related to one or more products or services.

7. The system of claim 6, wherein the price planning schedule is further based on the markdown profile.

8. The system of claim 1, wherein the manual pricing engine allows manual price changes to be entered for one or more products or services.

9. The system of claim 8, wherein the price planning schedule is further based on the manual price changes.

10. The system of claim 8, wherein the program code is further executable by one or more processors to implement a conversion engine for converting the manual price changes into a promotion.

11. A program product comprising non-transitory computer-readable media, the non-transitory computer-readable media comprising program code stored therein executable by one or more processors to implement:
    a price planning module configured to receive a price planning input data, to receive a budget data, to generate a price planning schedule, and to implement the price planning schedule, the price planning schedule configured to include at least one price change and the price change includes at least one of a price change timing data, a quantity limiting data, an automatic implementation data, a manual implementation data, a product data, and a service data, the price planning schedule further configured to include a markdown budget, wherein the markdown budget represents a budgeted difference between a gross margin associated with an initial retail price and an actual margin associated with a final price after markdowns;
    an automated pricing module configured to generate execute the program code for generating markdown data;
    a manual pricing module configured to generate execute the program code for generating manual pricing data;
    a conversion module configured to convert execute the program code for converting the manual price changes into a promotion;
    a pricing implementation module; and
    a slow seller management system including a product hierarchy module, the slow seller management system is configured to determine a slow seller based on actual sales, a target quota, and at least one of a past sales data, an inventory data, and an accrued cost of inventory data, the slow seller is a product selling at a slower rate than targeted quotas, the slow seller management system is further configured to generate a slow seller price modification and an implementation time data related to the slow seller price modification, wherein the slow seller price modification is a reduction in a price of the slow seller responsive to the slow seller selling the slower rate than targeted quotas, the slow seller management system is configured to obtain either a first determination that the slow seller price modification may be implemented without exceeding the markdown budget or a second determination that the slow seller price modification may not be implemented without exceeding the markdown budget;

wherein the automated pricing module is configured to implement the slow seller price modification based on the first result;

wherein the manual pricing module is configured to implement the slow seller price modification based on a slow seller price modification cost exceeding the markdown budget and an approval signal from a user;

wherein the price implementation module is configured to implement a markdown budget update module and an inventory tracking module based on the slow seller price modification;

wherein the slow seller management system is configured to generate and modify a markdown profile related to one or more products or services;

wherein the price planning module is configured to utilize the slow seller price modification to determine a subsequent season plan, wherein the subsequent season plan includes a plan to order a smaller quantity of the slow seller for a subsequent season based on the slow seller price modification.

12. The system of claim 11, wherein the pricing implementation means is configured to transmit the price planning schedule to one or more cash register systems to implement one or more slow seller price modifications in the price planning schedule.

13. The system of claim 12, wherein the pricing implementation means is configured to transmit the price planning schedule based on the satisfaction of one or more conditions.

14. The system of claim 11, wherein the program code is further executable to implement a user interface module and wherein the user interface module generates the price planning schedule including one or more slow seller price modifications for one or more products or services for sale at a retail location.

15. The system of claim 14, wherein the price planning schedule further includes a time period associated with the one or more slow seller price modifications.

16. The system of claim 11, wherein the price planning schedule is further based on the markdown profile.

17. The system of claim 11, wherein the manual pricing module allows manual price changes to be entered for one or more products or services.

18. The system of claim 17, wherein the price planning schedule is further based on the manual price changes.

19. A program product recorded on a physical medium readable by a computer for generating a price planning schedule, the program product comprising machine-readable program code for causing, when executed, one or more machines to implement:

a price planning engine configured to receive a price planning input data, to receive a budget data, to generate the price planning schedule, and to implement the price planning schedule, the price planning schedule configured to include at least one price change and the price change includes at least one of a price change timing data, a quantity limiting data, an automatic implementation data, a manual implementation data, a product data, and a service data, the price planning schedule further configured to include a markdown budget, wherein the markdown budget represents a budgeted difference between a gross margin associated with an initial retail price and an actual margin associated with a final price after markdowns;

a slow seller management system including a product hierarchy module, the slow seller management system is configured to determine a slow seller based on actual sales, a target quota, and at least one of a past sales data, an inventory data, and an accrued cost of inventory data, the slow seller is a product selling at a slower rate than targeted quotas, the slow seller management system is further configured to generate a slow seller price modification and an implementation time data related to the slow seller price modification, wherein the slow seller rice modification is a reduction in a price of the slow seller responsive to the slow seller selling the slower rate than targeted quotas, the slow seller management system is configured to reconcile the markdown budget with the slow seller price modification to obtain either a first determination that the slow seller price modification may be implemented without exceeding the markdown budget or a second determination that the slow seller price modification may not be implemented without exceeding the markdown budget;

an automated pricing engine is configured to implement the slow seller price modification based on the first determination;

a manual pricing engine is configured to implement the slow seller price modification based on a slow seller price modification cost exceeding the markdown budget and an approval signal from a user; and a price implementation engine is configured to implement a markdown budget update module and an inventory tracking module based on the slow seller price modification;

wherein the price planning engine is configured to utilize the slow seller price modification to determine a subsequent season plan, wherein the subsequent season plan includes a plan to order a smaller quantity of the slow seller for a subsequent season based on the slow seller price modification.

* * * * *